United States Patent
Liu et al.

(10) Patent No.: US 11,877,263 B2
(45) Date of Patent: *Jan. 16, 2024

(54) METHOD AND DEVICE IN COMMUNICATION NODES FOR WIRELESS COMMUNICATION

(71) Applicant: Honor Device Co., Ltd., Guangdong (CN)

(72) Inventors: Zheng Liu, Shanghai (CN); Xiaobo Zhang, Shanghai (CN); Lin Yang, Shanghai (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,722

(22) Filed: Mar. 17, 2023

(65) Prior Publication Data

US 2023/0224869 A1 Jul. 13, 2023

Related U.S. Application Data

(63) Continuation of application No. 17/035,742, filed on Sep. 29, 2020, now Pat. No. 11,641,639, which is a
(Continued)

(30) Foreign Application Priority Data

Jun. 11, 2018 (CN) .............................. 201810594265

(51) Int. Cl.
*H04W 72/02* (2009.01)
*H04W 24/08* (2009.01)
(Continued)

(52) U.S. Cl.
CPC ........... *H04W 72/02* (2013.01); *H04L 1/1812* (2013.01); *H04W 24/08* (2013.01);
(Continued)

(58) Field of Classification Search
CPC ... H04W 72/02; H04W 24/08; H04W 72/044; H04W 72/0446; H04W 72/0453; H04W 92/10; H04L 1/1812
See application file for complete search history.

(56) References Cited

U.S. PATENT DOCUMENTS 8,555,125 B2 10/2013 Sahara
8,855,069 B2 10/2014 Joachim et al.
(Continued)

FOREIGN PATENT DOCUMENTS

CN    101594637 A    12/2009
CN    102264039 A    11/2011
(Continued)

OTHER PUBLICATIONS

ISR in application PCT/CN2019/089287 dated Aug. 15, 2019.
(Continued)

*Primary Examiner* — Michael Thier
*Assistant Examiner* — Nevena Zecevic Sandhu
(74) *Attorney, Agent, or Firm* — Conley Rose, P.C.

(57) ABSTRACT

The present disclosure provides a method and a device in a communication node for wireless communications. The communication node first receives first information, the first information being used to determine a target time-frequency resource pool; and then monitors a first signaling; after that, when the first signaling is detected, the communication node receives a first radio signal; a first code block is used to generated the first radio signal; time-frequency resources occupied by the first signaling comprise a first time-frequency resource, while time-frequency resources occupied by the first radio signal comprise a second time-frequency resource; whether the first radio signal can be excluded from being used for combined decoding for the first code block is dependent on whether the first time-frequency resource
(Continued)

belongs to the target time-frequency resource pool. The present disclosure manages to improve the flexibility of buffer configurations.

20 Claims, 13 Drawing Sheets

Related U.S. Application Data continuation of application No. PCT/CN2019/089287, filed on May 30, 2019.

(51) Int. Cl.
*H04W 72/0446* (2023.01)
*H04W 72/0453* (2023.01)
*H04L 1/1812* (2023.01)
*H04W 72/044* (2023.01)
*H04W 92/10* (2009.01)

(52) U.S. Cl.
CPC ..... *H04W 72/044* (2013.01); *H04W 72/0446* (2013.01); *H04W 72/0453* (2013.01); *H04W 92/10* (2013.01)

(56) References Cited

U.S. PATENT DOCUMENTS

| | | | |
|---|---|---|---|
| 8,942,208 B2 | 1/2015 | Luo et al. | |
| 9,160,512 B2 | 10/2015 | Chen | |
| 10,440,771 B2 | 10/2019 | Chen et al. | |
| 10,506,624 B2 | 12/2019 | Zhang | |
| 2010/0146355 A1 | 6/2010 | Jiang et al. | |
| 2015/0055581 A1* | 2/2015 | Janis | H04B 7/046 370/329 |
| 2016/0127939 A1 | 5/2016 | Bathwal et al. | |
| 2017/0134146 A1 | 5/2017 | Chae et al. | |
| 2018/0234808 A1* | 8/2018 | Adachi | H04W 72/0453 |
| 2018/0254860 A1* | 9/2018 | Wong | H04L 1/1825 |
| 2018/0294927 A1 | 10/2018 | Takeda et al. | |
| 2018/0367265 A1* | 12/2018 | Wang | H04L 5/006 |
| 2020/0205128 A1* | 6/2020 | Baldemair | H04W 72/0446 |
| 2020/0274635 A1* | 8/2020 | Chen | H04L 1/0003 |
| 2020/0350963 A1* | 11/2020 | Su | H04B 7/063 |

FOREIGN PATENT DOCUMENTS

| | | |
|---|---|---|
| CN | 102484569 A | 5/2012 |
| CN | 106998591 A | 8/2017 |
| CN | 107027179 A | 8/2017 |
| CN | 107431581 A | 12/2017 |
| EP | 2214340 A1 | 8/2010 |
| WO | 2017078128 A1 | 5/2017 |

OTHER PUBLICATIONS

Interdigitalinc."Consideration on HARQ Management for Non-Terrestrial Networks" 3GPP TSG RAN WG1 Meeting #92# R1-1802631,Mar. 2, 2018(Mar. 2, 2018).

Interdigitalinc "Deactivating HARQ for Non-Terrestrial Networks" 3GPP TSG RAN WG1 Meeting #92bis R1-1804857,Apr. 20, 2018(Apr. 20, 2018).

Nokia et al."Consideration on HARQ Impact for NTN" 3GPP TSG RAN WG1 Meeting #93 R1-1805848,May 25, 2018 (May 25, 2018).

1st Office Action Received in Chinese Patent Application No. 201810594265.7 dated May 7, 2020.

1st Search Report received in Chinese Patent Application No. 201810594265.7 dated Apr. 27, 2020.

Supplementary search Report received in Chinese Patent Application No. 201810594265.7 dated Jun. 10, 2020.

Notice of grant patent received in Chinese Patent Application No. 201810594265.7 dated Jul. 28, 2020.

InterDigital Inc., "Deactivating HARQ for Non-Terrestrial Networks", 3GPP TSG RAN WG1 Meeting #92bis, R1-1804857, Sanya, China, Apr. 16-20, 2018, 2 pages.

InterDigital Inc., "Considerations on HARQ Management for Non-Terrestrial Networks", 3GPP TSG RAN WG1 Meeting #92, R1-1802631, Atehns, Greece, Feb. 26-Mar. 2, 2018, 3 pages.

Nokia et al., "Consideration on HARQ Impact for NTN", 3GPP TSG RAN WG1 Meeting #93, R1-1805848, Busan, Korea, May 21-25, 2018, 2 pages.

* cited by examiner

| $N'_{RE}$ | $\overline{N}'_{RE}$ | $n_{PRB}$ | $Q_m$ | TBS (bit) |
|---|---|---|---|---|
| $N'_{RE} \leq 9$ | 6 | 10 | 2 | 80 |
| $9 < N'_{RE} \leq 15$ | 12 | 8 | 2 | 128 |
| $15 < N'_{RE} \leq 30$ | 18 | 8 | 2 | 192 |
| $30 < N'_{RE} \leq 57$ | 42 | 6 | 2 | 336 |
| $57 < N'_{RE} \leq 90$ | 72 | 4 | 2 | 384 |
| $90 < N'_{RE} \leq 126$ | 108 | 2 | 2 | 288 |
| $126 < N'_{RE} \leq 150$ | 144 | 2 | 2 | 384 |
| $150 < N'_{RE}$ | 156 | 1 | 2 | 208 |

FIG. 9

METHOD AND DEVICE IN COMMUNICATION NODES FOR WIRELESS COMMUNICATION

CROSS REFERENCE TO RELATED APPLICATIONS

This application is a continuation of the U.S. patent application Ser. No. 17/035,742, field on Sep. 29, 2020, which is a continuation of International Application PCT/CN2019/089287, filed May 30, 2019, claims the priority benefit of Chinese Patent Application No. 201810594265.7, filed on Jun. 11, 2018, the full disclosure of which is incorporated herein by reference.

BACKGROUND

Technical Field

The present disclosure relates to transmission methods and devices in wireless communication systems, and in particular to a transmission scheme and device in non-terrestrial wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

The 3GPP RAN #75 plenary session also approved a study item of NR-backed Non-Terrestrial Networks (NTN), which started with R15, to adapt to varying application scenarios and meet respective requirements. And a WI in R16 was then started to standardize relevant techniques. Transmission delay in NTN is much longer than in terrestrial networks.

SUMMARY

In a large-delay network, such as NTN, an increase in a number of Hybrid Automatic Repeat Request (HARQ) processes or the length of a Transmission Time Interval (TTI) can be an effective way of guaranteeing Data Rate. On the other hand, as the number of HARQ processes or the length of TTI increases, a more demanding request of enhancing a User Equipment (UE)'s buffer capacity has to be met. A HARQ-switch-supporting method is therefore employed to control an amount of soft information for combined decoding that needs to be stored to reduce the UE's buffering demand.

To address the issue of HARQ configuration in large-delay networks or a network with restricted buffer capabilities, the present disclosure proposes a solution. It should be noted that the embodiments of the base station of the present disclosure and the characteristics in the embodiments may be applied to a User Equipment (UE) if no conflict is incurred, and vice versa. In the case of no conflict, the embodiments of the present disclosure and the characteristics in the embodiments may be combined with each other arbitrarily.

The present disclosure provides a method in a first-type communication node for wireless communications, comprising:
  receiving first information, the first information being used to determine a target time-frequency resource pool;
  monitoring a first signaling; and
  receiving a first radio signal when the first signaling is detected;
  herein, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface.

In one embodiment, combined decoding on a Transport Block (TB) or a code block (CB) can be controlled through the configuration of the target time-frequency resource pool via the first signaling, in which the configuration flexibility of combined decoding (or, switching of HARQ) is maximized, and an enhancement in link performance and a reduction in the UE's buffer growth can both be achieved.

In one embodiment, the first-type communication node determines whether combined decoding (or buffering, or HARQ switching) can be performed according to the relationship between the first time-frequency resource, or the second time-frequency resource, and the target time-frequency resource pool, thereby achieving separate configurations of HARQ process and combined decoding (or HARQ switching). Such practice contributes to a balance between acquiring combined gains and reducing UE's buffer and also an improvement in the network's entire performance.

According to one aspect of the present disclosure, the above method is characterized in that the target time-frequency resource pool comprises K candidate time-frequency resource(s), and the channel decoding of the first radio signal is failed; whether the first time-frequency resource belongs to one of the K candidate time-frequency resource(s) is used to determine whether the first radio signal can be excluded from being used for the combined decoding for the first code block, or whether the second time-frequency resource belongs to one of the K candidate time-frequency resource(s) is used to determine whether the first radio signal can be excluded from being used for the combined decoding for the first code block; K is a positive integer.

According to one aspect of the present disclosure, the above method is characterized in that the first signaling is used to indicate time-frequency resources occupied by the first radio signal, and a number of resource elements comprised in the time-frequency resources occupied by the first radio signal is used to determine a number of bits comprised in the first code block.

According to one aspect of the present disclosure, the above method is characterized in further comprising:
receiving a second signaling; and
receiving a second radio signal;
herein, the first code block goes through channel coding to output a first bit block, and X1 bit(s) in the first bit block is(are) used to generate the first radio signal, the first bit block comprising no fewer than X1 bit(s), X1 being a positive integer; the second signaling is used to determine X2 bit(s) in the first bit block, the X2 bit(s) being used to generate the second radio signal; of the X1 bit(s) and the X2 bit(s) only the X2 bit(s) is(are) used for decoding of the first code block; the second signaling is transmitted via the air interface.

According to one aspect of the present disclosure, the above method is characterized in further comprising:
transmitting a third signaling;
herein, the third signaling is used to indicate whether channel decoding of the first radio signal is failed, the third signaling being transmitted via the air interface.

According to one aspect of the present disclosure, the above method is characterized in further comprising:
transmitting second information;
herein, the second information is used to indicate a capability of combined decoding of a receiver of the first radio signal, the second information being transmitted via the air interface.

According to one aspect of the present disclosure, the above method is characterized in further comprising:
receiving third information;
herein, the third information is used to determine a first time-frequency resource pool, and time-frequency resources occupied by the first signaling belong to the first time-frequency resource pool, and all time-frequency resources in the target time-frequency resource pool belong to the first time-frequency resource pool, the third information being transmitted via the air interface.

In one embodiment, the target time-frequency resource pool is determined by combining the first information and the third information in the present disclosure, taking into account both the configuration of a search space or a Control Resource Set (CORESET) for a PDCCH and the configuration of combined decoding (or data buffer, or HARQ switch), which ensures compatibility with the existing system and prevents conflicts over signaling configurations.

The present disclosure provides a method in a second-type communication node for wireless communications, comprising:
transmitting first information, the first information being used to determine a target time-frequency resource pool;
transmitting a first signaling; and
transmitting a first radio signal;
herein, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface.

According to one aspect of the present disclosure, the above method is characterized in that the target time-frequency resource pool comprises K candidate time-frequency resource(s), and the channel decoding of the first radio signal is failed; whether the first time-frequency resource belongs to one of the K candidate time-frequency resource(s) is used to determine whether the first radio signal can be excluded from being used for the combined decoding for the first code block, or whether the second time-frequency resource belongs to one of the K candidate time-frequency resource(s) is used to determine whether the first radio signal can be excluded from being used for the combined decoding for the first code block; K is a positive integer.

According to one aspect of the present disclosure, the above method is characterized in that the first signaling is used to indicate time-frequency resources occupied by the first radio signal, and a number of resource elements comprised in the time-frequency resources occupied by the first radio signal is used to determine a number of bits comprised in the first code block.

According to one aspect of the present disclosure, the above method is characterized in further comprising:
transmitting a second signaling; and
transmitting a second radio signal;
herein, the first code block goes through channel coding to output a first bit block, and X1 bit(s) in the first bit block is(are) used to generate the first radio signal, the first bit block comprising no fewer than X1 bit(s), X1 being a positive integer; the second signaling is used to determine X2 bit(s) in the first bit block, the X2 bit(s) being used to generate the second radio signal; of the X1 bit(s) and the X2 bit(s) only the X2 bit(s) is(are) used for decoding of the first code block; the second signaling is transmitted via the air interface.

According to one aspect of the present disclosure, the above method is characterized in further comprising:
receiving a third signaling;
herein, the third signaling is used to indicate whether channel decoding of the first radio signal is failed, the third signaling being transmitted via the air interface.

According to one aspect of the present disclosure, the above method is characterized in further comprising:
receiving second information;
herein, the second information is used to indicate a capability of combined decoding of a receiver of the first radio signal, the second information being transmitted via the air interface.

According to one aspect of the present disclosure, the above method is characterized in further comprising:
transmitting third information;
herein, the third information is used to determine a first time-frequency resource pool, and time-frequency resources occupied by the first signaling belong to the first time-frequency resource pool, and all time-frequency resources in the target time-frequency resource pool belong to the first time-frequency resource pool, the third information being transmitted via the air interface.

The present disclosure provides a first-type communication node for wireless communications, comprising:

a first transceiver, which receives first information, the first information being used to determine a target time-frequency resource pool;

a second transceiver, which monitors a first signaling; and a first receiver, which receives a first radio signal when the first signaling is detected;

herein, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface.

According to one aspect of the present disclosure, the above first-type communication node is characterized in that the target time-frequency resource pool comprises K candidate time-frequency resource(s), and the channel decoding of the first radio signal is failed; whether the first time-frequency resource belongs to one of the K candidate time-frequency resource(s) is used to determine whether the first radio signal can be excluded from being used for the combined decoding for the first code block, or whether the second time-frequency resource belongs to one of the K candidate time-frequency resource(s) is used to determine whether the first radio signal can be excluded from being used for the combined decoding for the first code block; K is a positive integer.

According to one aspect of the present disclosure, the above first-type communication node is characterized in that the first signaling is used to indicate time-frequency resources occupied by the first radio signal, and a number of resource elements comprised in the time-frequency resources occupied by the first radio signal is used to determine a number of bits comprised in the first code block.

According to one aspect of the present disclosure, the above first-type communication node is characterized in that the second transceiver receives a second signaling; and the first receiver receives a second radio signal; herein, the first code block goes through channel coding to output a first bit block, and X1 bit(s) in the first bit block is(are) used to generate the first radio signal, the first bit block comprising no fewer than X1 bit(s), X1 being a positive integer; the second signaling is used to determine X2 bit(s) in the first bit block, the X2 bit(s) being used to generate the second radio signal; of the X1 bit(s) and the X2 bit(s) only the X2 bit(s) is(are) used for decoding of the first code block; the second signaling is transmitted via the air interface.

According to one aspect of the present disclosure, the above first-type communication node is characterized in that the second transceiver transmits a third signaling; herein, the third signaling is used to indicate whether channel decoding of the first radio signal is failed, the third signaling being transmitted via the air interface.

According to one aspect of the present disclosure, the above first-type communication node is characterized in that the first transceiver transmits second information; herein, the second information is used to indicate a capability of combined decoding of a receiver of the first radio signal, the second information being transmitted via the air interface.

According to one aspect of the present disclosure, the above first-type communication node is characterized in that the first transceiver receives third information; herein, the third information is used to determine a first time-frequency resource pool, and time-frequency resources occupied by the first signaling belong to the first time-frequency resource pool, and all time-frequency resources in the target time-frequency resource pool belong to the first time-frequency resource pool, the third information being transmitted via the air interface.

The present disclosure provides a second-type communication node for wireless communications, comprising:

a third transceiver, which transmits first information, the first information being used to determine a target time-frequency resource pool;

a fourth transceiver, which transmits a first signaling; and a first transmitter, which transmits a first radio signal;

herein, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface.

According to one aspect of the present disclosure, the above second-type communication node is characterized in that the target time-frequency resource pool comprises K candidate time-frequency resource(s), and the channel decoding of the first radio signal is failed; whether the first time-frequency resource belongs to one of the K candidate time-frequency resource(s) is used to determine whether the first radio signal can be excluded from being used for the combined decoding for the first code block, or whether the second time-frequency resource belongs to one of the K candidate time-frequency resource(s) is used to determine whether the first radio signal can be excluded from being used for the combined decoding for the first code block; K is a positive integer.

According to one aspect of the present disclosure, the above second-type communication node is characterized in that the first signaling is used to indicate time-frequency resources occupied by the first radio signal, and a number of resource elements comprised in the time-frequency resources occupied by the first radio signal is used to determine a number of bits comprised in the first code block.

According to one aspect of the present disclosure, the above second-type communication node is characterized in that the fourth transceiver transmits a second signaling; and the first transmitter transmits a second radio signal; herein, the first code block goes through channel coding to output a first bit block, and X1 bit(s) in the first bit block is(are) used to generate the first radio signal, the first bit block comprising no fewer than X1 bit(s), X1 being a positive integer; the second signaling is used to determine X2 bit(s) in the first bit block, the X2 bit(s) being used to generate the second radio signal; of the X1 bit(s) and the X2 bit(s) only the X2 bit(s) is(are) used for decoding of the first code block; the second signaling is transmitted via the air interface.

According to one aspect of the present disclosure, the above second-type communication node is characterized in that the fourth transceiver receives a third signaling; herein, the third signaling is used to indicate whether channel decoding of the first radio signal is failed, the third signaling being transmitted via the air interface.

According to one aspect of the present disclosure, the above second-type communication node is characterized in that the third transceiver receives second information; herein, the second information is used to indicate a capability of combined decoding of a receiver of the first radio signal, the second information being transmitted via the air interface.

According to one aspect of the present disclosure, the above second-type communication node is characterized in that the third transceiver transmits third information; herein, the third information is used to determine a first time-frequency resource pool, and time-frequency resources occupied by the first signaling belong to the first time-frequency resource pool, and all time-frequency resources in the target time-frequency resource pool belong to the first time-frequency resource pool, the third information being transmitted via the air interface.

In one embodiment, the present disclosure has the following technical advantages:

The present disclosure provides a method of flexibly configuring combined decoding (or buffer capability, or HARQ switching) for the UE, through which the network equipment is able to configure combined decoding (or buffer capability, or HARQ switching) for a transmission according to scheduling requests, without being supported by a dynamic signaling, but taking advantage of the flexibility of combined decoding (or switching of HARQ) configuration to the largest extent, hence an enhancement in the link performance and a reduction in the UE's buffer growth.

The method in the present disclosure makes it possible to separately configure HARQ process and combined decoding (or, HARQ switching), thus striking a balance between acquiring combined gains and reducing the UE's buffer, and finally improving the network's entire performance.

Considering both the configuration of a search space or a CORESET of a PDCCH and the configuration of combined decoding (or data buffer, or HARQ switching), the method in the present disclosure is put forward to ensure compatibility with the current system and avoid conflicting signaling configurations.

BRIEF DESCRIPTION OF THE DRAWINGS

Other features, objects and advantages of the present disclosure will become more apparent from the detailed description of non-restrictive embodiments taken in conjunction with the following drawings:

FIG. 9 illustrates a schematic diagram of relationship between time-frequency resources occupied by a first radio signal and a number of bits comprised in a first code block according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
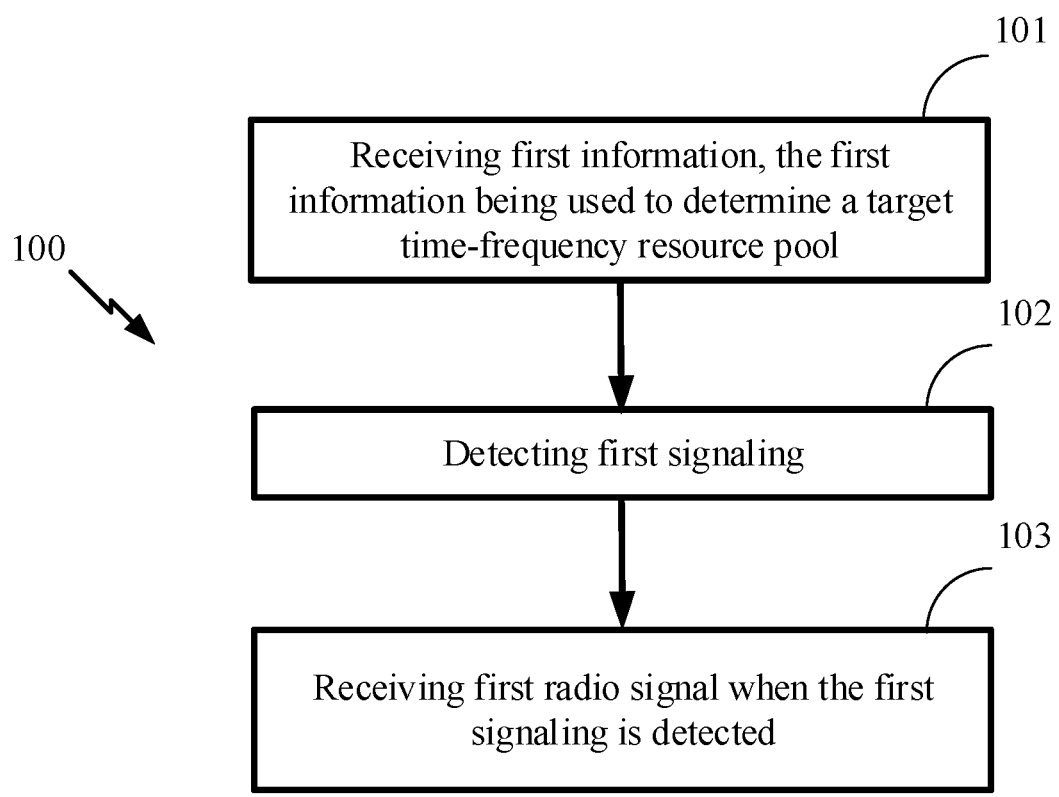
FIG. 1 illustrates a flowchart of first information, a first signaling and a first radio signal according to one embodiment of the present disclosure.

Embodiment 1 illustrates a flowchart of first information, a first signaling and a first radio signal according to one embodiment of the present disclosure, as shown in FIG. 1. In FIG. 1, each box represents a step. In Embodiment 1, a first-type communication node in the present disclosure first receives first information, the first information being used to determine a target time-frequency resource pool; and then monitors a first signaling; and receives a first radio signal when the first signaling is detected; herein, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface.

In one embodiment, the target time-frequency resource pool comprises K candidate time-frequency resource(s), and the channel decoding of the first radio signal is failed; whether the first time-frequency resource belongs to one of the K candidate time-frequency resource(s) is used to determine whether the first radio signal can be excluded from being used for the combined decoding for the first code block, or whether the second time-frequency resource belongs to one of the K candidate time-frequency resource(s) is used to determine whether the first radio signal can be excluded from being used for the combined decoding for the first code block; K is a positive integer.

In one embodiment, the first signaling is used to indicate time-frequency resources occupied by the first radio signal, and a number of resource elements comprised in the time-frequency resources occupied by the first radio signal is used to determine a number of bits comprised in the first code block.

In one embodiment, further comprising:
receiving a second signaling; and
receiving a second radio signal;
herein, the first code block goes through channel coding to output a first bit block, and X1 bit(s) in the first bit block is(are) used to generate the first radio signal, the first bit block comprising no fewer than X1 bit(s), X1 being a positive integer; the second signaling is used to determine X2 bit(s) in the first bit block, the X2 bit(s) being used to generate the second radio signal; of the X1 bit(s) and the X2 bit(s) only the X2 bit(s) is(are) used for decoding of the first code block; the second signaling is transmitted via the air interface.

In one embodiment, further comprising:
transmitting a third signaling;
herein, the third signaling is used to indicate whether channel decoding of the first radio signal is failed, the third signaling being transmitted via the air interface.

In one embodiment, further comprising:
transmitting second information;
herein, the second information is used to indicate a capability of combined decoding of a receiver of the first radio signal, the second information being transmitted via the air interface.

In one embodiment, further comprising:
receiving third information;
herein, the third information is used to determine a first time-frequency resource pool, and time-frequency resources occupied by the first signaling belong to the first time-frequency resource pool, and all time-frequency resources in the target time-frequency resource pool belong to the first time-frequency resource pool, the third information being transmitted via the air interface.

In one embodiment, the first information is transmitted via a higher-layer signaling.

In one embodiment, the first information is transmitted via a physical-layer signaling.

In one embodiment, the first information comprises all or part of a higher-layer signaling.

In one embodiment, the first information comprises all or part of a physical-layer signaling.

In one embodiment, the first information is transmitted through a Physical Broadcast Channel (PBCH).

In one embodiment, the first information comprises one or more fields in a Master Information Block (MIB).

In one embodiment, the first information is transmitted through a Downlink Shared Channel (DL-SCH).

In one embodiment, the first information is transmitted through a Physical Downlink Shared Channel (PDSCH).

In one embodiment, the first information comprises one or more fields in a System Information Block (SIB).

In one embodiment, the first information comprises one or more fields in Remaining System Information (RMSI).

In one embodiment, the first information comprises all or part of a Radio Resource Control (RRC) signaling.

In one embodiment, the first information is broadcast.
In one embodiment, the first information is unicast.
In one embodiment, the first information is Cell-Specific.
In one embodiment, the first information is UE-specific.
In one embodiment, the first information is transmitted through a Physical Downlink Control Channel (PDCCH).

In one embodiment, the first information comprises one or more fields in a Downlink Control Information (DCI) signaling.

In one embodiment, the first information is transmitted through a PDCCH that schedules the first radio signal.

In one embodiment, the first information comprises one or more fields in a DCI signaling that schedules the first radio signal.

In one embodiment, the phrase that the first information is used to determine the target time-frequency resource pool means that the first information is used for directly indicating the target time-frequency resource pool.

In one embodiment, the phrase that the first information is used to determine the target time-frequency resource pool means that the first information is used for indirectly indicating the target time-frequency resource pool.

In one embodiment, the phrase that the first information is used to determine the target time-frequency resource pool means that the first information is used for explicitly indicating the target time-frequency resource pool.

In one embodiment, the phrase that the first information is used to determine the target time-frequency resource pool means that the first information is used for implicitly indicating the target time-frequency resource pool.

In one embodiment, the target time-frequency resource pool comprises contiguous frequency-domain resources.

In one embodiment, the target time-frequency resource pool comprises discrete frequency-domain resources.

In one embodiment, the target time-frequency resource pool comprises contiguous time-domain resources.

In one embodiment, the target time-frequency resource pool comprises discrete time-domain resources.

In one embodiment, the target time-frequency resource pool comprises all Physical Resource Blocks (PRBs) in a Carrier to which the target time-frequency resource pool belongs in frequency domain.

In one embodiment, the target time-frequency resource pool comprises part of Physical Resource Blocks (PRBs) in a Carrier to which the target time-frequency resource pool belongs in frequency domain.

In one embodiment, time-domain resources comprised by the target time-frequency resource pool are periodically occurring in time domain.

In one embodiment, the target time-frequency resource pool comprises M slots in time domain, M being a positive integer, and the phrase that the first information is used to determine the target time-frequency resource pool means that the first information is used to indicate the M slots.

In one embodiment, the target time-frequency resource pool comprises M subframes in time domain, M being a positive integer, and the phrase that the first information is used to determine the target time-frequency resource pool means that the first information is used to indicate the M subframes.

In one embodiment, the target time-frequency resource pool comprises M sub-slots in time domain, M being a positive integer, and the phrase that the first information is used to determine the target time-frequency resource pool means that the first information is used to indicate the M sub-slots.

In one embodiment, the phrase that the first information is used to determine the target time-frequency resource pool means that the first information comprises a bitmap, and the bitmap is used to indicate M time units within a period; each of the M time units is a positive integer number of slot(s), or each of the M time units is a positive integer number of subframe(s), or each of the M time units is a positive integer number of sub-slot(s); the target time-frequency resource pool comprises the M time units in time domain, M being a positive integer, herein each bit in the bitmap corresponds to one of the M time units.

In one embodiment, the first information comprises a bitmap and a periodic value, of which the bitmap is used to indicate M time units within a period, and a time length of a period to which the M time units belong is equal to the periodic value comprised by the first information; each of the M time units is a positive integer number of slot(s), or each of the M time units is a positive integer number of subframe(s), or each of the M time units is a positive integer number of sub-slot(s); the target time-frequency resource pool comprises the M time units in time domain, M being a positive integer, herein each bit in the bitmap corresponds to one of the M time units.

In one embodiment, the first signaling is unicast.

In one embodiment, the first signaling is UE-specific.

In one embodiment, the first signaling is transmitted through a Physical Downlink Control Channel (PDCCH).

In one embodiment, the first signaling is transmitted through a PDCCH of which Cyclic Redundancy Check (CRC) is scrambled by a C-RNTI.

In one embodiment, the first signaling is transmitted through a PDCCH in a UE-specific Search Space (USS).

In one embodiment, the first signaling is all or part of fields in a DCI signaling.

In one embodiment, the first signaling is a physical-layer signaling.

In one embodiment, the first signaling is a higher-layer signaling.

In one embodiment, the first signaling is all or part of Information Elements (IEs) in an RRC signaling.

In one embodiment, the first information is a part of the first signaling.

In one embodiment, the first information is carried by a signaling other than the first signaling.

In one embodiment, the first signaling carries the first information.

In one embodiment, detecting of the first signaling is implemented through blind detection by the first-type communication node.

In one embodiment, detecting of the first signaling is implemented through blind detection by the first-type communication node in a UE-specific Search Space (USS) configured by itself.

In one embodiment, detecting of the first signaling is implemented through blind decoding by the first-type communication node in a UE-specific Search Space (USS) configured by itself.

In one embodiment, detecting of the first signaling is implemented through decoding and CRC verification by the first-type communication node on each PDCCH candidate in a UE-specific Search Space (USS) configured by itself.

In one embodiment, a HARQ process to which the first radio signal belongs is not defined.

In one embodiment, a HARQ process to which the first radio signal belongs is defined.

In one embodiment, there is a field in the first signaling being used to indicate a process ID of a HARQ process to which the first radio signal belongs.

In one embodiment, there isn't any field in the first signaling being used to indicate a process ID of a HARQ process to which the first radio signal belongs.

In one embodiment, a process ID of a HARQ process to which the first radio signal belongs is equal to a default value.

In one embodiment, a process ID of a HARQ process to which the first radio signal belongs is equal to 0.

In one embodiment, a process ID of a HARQ process to which the first radio signal belongs is equal to a maximum value that can be supported.

In one embodiment, a HARQ process to which the first radio signal belongs is a Broadcast HARQ Process, the first radio signal being unicast.

In one embodiment, there is a field in the first signaling that indicates a process ID of a HARQ process to which the first radio signal belongs, and the process ID of the HARQ process to which the first radio signal belongs exceeds a maximum HARQ process ID that can be supported.

In one embodiment, there is a field in the first signaling that indicates a process ID of a HARQ process to which the first radio signal belongs, and the process ID of the HARQ process to which the first radio signal belongs exceeds a maximum number of HARQ processes that can be supported reduced by 1.

In one embodiment, the first radio signal is unicast.

In one embodiment, the first radio signal is UE-specific.

In one embodiment, the first radio signal is not used for carrying System Information (SI).

In one embodiment, the first radio signal is not used for carrying Paging Message.

In one embodiment, the first radio signal is not used for a Random Access Procedure.

In one embodiment, the first radio signal is not used for carrying broadcast or groupcast information.

In one embodiment, the first radio signal is used for transmitting the first code block.

In one embodiment, the first radio signal carries the first code block.

In one embodiment, the first radio signal only carries the first code block.

In one embodiment, the first radio signal also carries a code block (CB) other than the first code block.

In one embodiment, the first radio signal is transmitted through a Downlink Shared Channel (DL-SCH).

In one embodiment, the first radio signal is transmitted through a Physical Downlink Shared Channel (PDSCH).

In one embodiment, the first radio signal comprises an initial transmission of a Transport Block (TB).

In one embodiment, the first radio signal comprises a retransmission of a Transport Block (TB).

In one embodiment, the first radio signal comprises an initial transmission of the first code block.

In one embodiment, the first radio signal comprises a retransmission of the first code block.

In one embodiment, the first radio signal is obtained by the first code block sequentially through CRC Insertion, Channel Coding, Rate Matching, Concatenation, Scrambling, Modulation, and Layer Mapping, Precoding, Mapping to Resource Element, and OFDM Baseband Signal Generation as well as Modulation and Upconversion; an initial value of a scrambling sequence is related to a characteristic identifier of the first-type communication node.

In one embodiment, the first radio signal is obtained by the first code block sequentially through CRC Insertion, Channel Coding, Rate Matching, Concatenation, Scrambling, Modulation, and Layer Mapping, Precoding, Mapping to Resource Element, and OFDM Baseband Signal Generation as well as Modulation and Upconversion; an initial value of a scrambling sequence is related to a Cell Radio Network Temporary Identifier (C-RNTI) of the first-type communication node.

In one embodiment, the first radio signal is obtained by the first code block sequentially through CRC Insertion, Channel Coding, Rate Matching, Concatenation with other bits to generate a first bit block, Scrambling, Modulation, and Layer Mapping, Precoding, Mapping to Resource Element, and OFDM Baseband Signal Generation as well as Modulation and Upconversion; an initial value of a scrambling sequence is related to a Cell Radio Network Temporary Identifier (C-RNTI) of the first-type communication node.

In one embodiment, the first radio signal is obtained by the first code block sequentially through CRC Insertion, Channel Coding, Rate Matching, Scrambling, Modulation, and Layer Mapping, Precoding, Mapping to Resource Element, and OFDM Baseband Signal Generation as well as Modulation and Upconversion; an initial value of a scrambling sequence is related to a Cell Radio Network Temporary Identifier (C-RNTI) of the first-type communication node.

In one embodiment, the first code block is a CB.

In one embodiment, the first code block is one of CB s obtained by a Transport Block (TB) sequentially through TB CRC Insertion, Code Block Segmentation, and CB CRC Insertion.

In one embodiment, the first code block is obtained by a Transport Block (TB) through TB CRC Insertion.

In one embodiment, processing on soft buffer or soft combining of the first code block when transmitted in the first radio signal is different from that of another code block when is transmitted in a radio signal other than the first radio signal.

In one embodiment, there is a code block in a radio signal other than the first radio signal of which the processing on soft buffer or soft combining is different from that of the first code block.

In one embodiment, the channel decoding failure means that CRC check is not passed when performing channel decoding on the first radio signal.

In one embodiment, the channel decoding failure means that the first radio signal is not received correctly.

In one embodiment, only the first code block is used to generate the first radio signal.

In one embodiment, there is a code block other than the first code block being used to generate the first radio signal.

In one embodiment, time-frequency resources occupied by the first signaling only comprise the first time-frequency resource.

In one embodiment, time-frequency resources occupied by the first signaling refer to the first time-frequency resource.

In one embodiment, time-frequency resources occupied by the first signaling also comprise time-frequency resources other than the first time-frequency resource.

In one embodiment, time-frequency resources occupied by the first radio signal only comprise the second time-frequency resource.

In one embodiment, time-frequency resources occupied by the first radio signal refer to the second time-frequency resource.

In one embodiment, time-frequency resources occupied by the first radio signal also comprise time-frequency resources other than the second time-frequency resource.

In one embodiment, whether the first radio signal can be excluded from being used for the combined decoding for the first code block is only dependent on whether the first time-frequency resource belongs to the target time-frequency resource pool.

In one embodiment, whether the first radio signal can be excluded from being used for the combined decoding for the first code block is also dependent on factors other than whether the first time-frequency resource belongs to the target time-frequency resource pool.

In one embodiment, whether the first radio signal can be excluded from being used for the combined decoding for the first code block is only dependent on whether the second time-frequency resource belongs to the target time-frequency resource pool.

In one embodiment, whether the first radio signal can be excluded from being used for the combined decoding for the first code block is also dependent on factors other than whether the second time-frequency resource belongs to the target time-frequency resource pool.

In one embodiment, whether the first radio signal can be excluded from being used for the combined decoding for the first code block is dependent on whether the first time-frequency resource belongs to the target time-frequency resource pool and whether the second time-frequency resource belongs to the target time-frequency resource pool.

In one embodiment, the phrase that whether the first radio signal can be excluded from being used for combined decoding for the first code block is dependent on whether the first time-frequency resource belongs to the target time-frequency resource pool means that the first radio signal can be excluded from being used for combined decoding for the first code block and whether the first time-frequency resource belongs to the target time-frequency resource pool correspond to each other.

In one embodiment, the phrase that whether the first radio signal can be excluded from being used for combined decoding for the first code block is dependent on whether the first time-frequency resource belongs to the target time-frequency resource pool means that whether the first radio signal can be excluded from being used for combined decoding for the first code block corresponds to whether the first time-frequency resource belongs to the target time-frequency resource pool based on a given mapping relation.

In one embodiment, the phrase that whether the first radio signal can be excluded from being used for combined decoding for the first code block is dependent on whether the first time-frequency resource belongs to the target time-frequency resource pool means that whether the first time-frequency resource belongs to the target time-frequency resource pool is used to determine whether the first radio signal can be excluded from being used for combined decoding for the first code block.

In one embodiment, the phrase that whether the first radio signal can be excluded from being used for combined decoding for the first code block is dependent on whether the second time-frequency resource belongs to the target time-frequency resource pool means that the first radio signal can be excluded from being used for combined decoding for the first code block and whether the second time-frequency resource belongs to the target time-frequency resource pool correspond to each other.

In one embodiment, the phrase that whether the first radio signal can be excluded from being used for combined decoding for the first code block is dependent on whether the second time-frequency resource belongs to the target time-frequency resource pool means that whether the first radio signal can be excluded from being used for combined decoding for the first code block corresponds to whether the second time-frequency resource belongs to the target time-frequency resource pool based on a given mapping relation.

In one embodiment, the phrase that whether the first radio signal can be excluded from being used for combined decoding for the first code block is dependent on whether the second time-frequency resource belongs to the target time-frequency resource pool means that whether the second time-frequency resource belongs to the target time-frequency resource pool is used to determine whether the first radio signal can be excluded from being used for combined decoding for the first code block.

In one embodiment, the phrase that whether the first radio signal can be excluded from being used for combined decoding for the first code block is dependent on whether the first time-frequency resource belongs to the target time-frequency resource pool means that when the first time-frequency resource belongs to the target time-frequency resource pool, the first radio signal can be excluded from being used for combined decoding for the first code block; when the first time-frequency resource comprises time-frequency resources outside the target time-frequency resource pool, the first radio signal is used for the combined decoding for the first code block.

In one embodiment, the phrase that whether the first radio signal can be excluded from being used for combined decoding for the first code block is dependent on whether the first time-frequency resource belongs to the target time-frequency resource pool means that when the first time-frequency resource belongs to the target time-frequency resource pool, the first radio signal is used for the combined decoding for the first code block; when the first time-frequency resource comprises time-frequency resources outside the target time-frequency resource pool, the first radio signal can be excluded from being used for combined decoding for the first code block.

In one embodiment, the phrase that whether the first radio signal can be excluded from being used for combined decoding for the first code block is dependent on whether the first time-frequency resource belongs to the target time-frequency resource pool means that when the first time-frequency resource belongs to the target time-frequency resource pool, a HARQ of the first radio signal can be switched-off (deactive or off); when the first time-frequency resource comprises time-frequency resources outside the target time-frequency resource pool, a HARQ of the first radio signal is switched-on (active or on), which is used for combined decoding for the first code block.

In one embodiment, the phrase that whether the first radio signal can be excluded from being used for combined decoding for the first code block is dependent on whether the first time-frequency resource belongs to the target time-frequency resource pool means that when the first time-frequency resource belongs to the target time-frequency resource pool, a HARQ of the first radio signal is switched-on (active or on); when the first time-frequency resource comprises time-frequency resources outside the target time-frequency resource pool, a HARQ of the first radio signal can be switched-off (deactive or off).

In one embodiment, the phrase that "when channel decoding of the first radio signal is failed, whether the first radio signal can be excluded from being used for combined decoding for the first code block is dependent on whether the first time-frequency resource belongs to the target time-frequency resource pool" means that: when the channel decoding of the first radio signal is failed, if the first time-frequency resource belongs to the target time-frequency resource pool, bits output by channel coding of the first code block carried by the first radio signal can be excluded from being buffered by the first-type communication node; if the first time-frequency resource comprises time-frequency resources outside the target time-frequency resource pool, bits output by channel coding of the first code block carried by the first radio signal are buffered by the first-type communication node.

In one embodiment, the phrase that "when channel decoding of the first radio signal is failed, whether the first radio signal can be excluded from being used for combined decoding for the first code block is dependent on whether the first time-frequency resource belongs to the target time-frequency resource pool" means that: when the channel decoding of the first radio signal is failed, if the first time-frequency resource belongs to the target time-frequency resource pool, bits output by channel coding of the first code block carried by the first radio signal are buffered by the first-type communication node; if the first time-frequency resource comprises time-frequency resources outside the target time-frequency resource pool, bits output by channel coding of the first code block carried by the first radio signal are not buffered by the first-type communication node.

In one embodiment, the phrase that whether the first radio signal can be excluded from being used for combined decoding for the first code block is dependent on whether the second time-frequency resource belongs to the target time-frequency resource pool means that when the second time-frequency resource belongs to the target time-frequency resource pool, the first radio signal can be excluded from being used for combined decoding for the first code block; when the second time-frequency resource comprises time-frequency resources outside the target time-frequency resource pool, the first radio signal is used for the combined decoding for the first code block.

In one embodiment, the phrase that whether the first radio signal can be excluded from being used for combined decoding for the first code block is dependent on whether the second time-frequency resource belongs to the target time-frequency resource pool means that when the second time-frequency resource belongs to the target time-frequency resource pool, the first radio signal is used for combined decoding for the first code block; when the second time-frequency resource comprises time-frequency resources outside the target time-frequency resource pool, the first radio signal can be excluded from being used for the combined decoding for the first code block.

In one embodiment, the phrase that whether the first radio signal can be excluded from being used for combined decoding for the first code block is dependent on whether the second time-frequency resource belongs to the target time-frequency resource pool means that when the second time-frequency resource belongs to the target time-frequency resource pool, a HARQ of the first radio signal can be switched-off (deactive or off); when the second time-frequency resource comprises time-frequency resources outside the target time-frequency resource pool, a HARQ of the first radio signal is switched-on (active or on).

In one embodiment, the phrase that whether the first radio signal can be excluded from being used for combined decoding for the first code block is dependent on whether the second time-frequency resource belongs to the target time-frequency resource pool means that when the second time-frequency resource belongs to the target time-frequency resource pool, a HARQ of the first radio signal is switched-on (active or on); when the second time-frequency resource comprises time-frequency resources outside the target time-frequency resource pool, a HARQ of the first radio signal can be switched-off (deactive or off).

In one embodiment, the phrase that "when channel decoding of the first radio signal is failed, whether the first radio signal can be excluded from being used for combined decoding for the first code block is dependent on whether the second time-frequency resource belongs to the target time-frequency resource pool" means that: when the channel decoding of the first radio signal is failed, if the second time-frequency resource belongs to the target time-frequency resource pool, bits output by channel coding of the first code block carried by the first radio signal are not buffered by the first-type communication node; if the second time-frequency resource comprises time-frequency resources outside the target time-frequency resource pool, bits output by channel coding of the first code block carried by the first radio signal are buffered by the first-type communication node.

In one embodiment, the phrase that "when channel decoding of the first radio signal is failed, whether the first radio signal can be excluded from being used for combined decoding for the first code block is dependent on whether the second time-frequency resource belongs to the target time-frequency resource pool" means that: when the channel decoding of the first radio signal is failed, if the second time-frequency resource belongs to the target time-frequency resource pool, bits output by channel coding of the first code block carried by the first radio signal are buffered by the first-type communication node; if the second time-frequency resource comprises time-frequency resources outside the target time-frequency resource pool, bits output by channel coding of the first code block carried by the first radio signal are not buffered by the first-type communication node.

In one embodiment, the phrase that "when channel decoding of the first radio signal is failed, the first radio signal can be excluded from being used for combined decoding for the first code block" means that when channel decoding of the first radio signal is failed, whether the first radio signal is used for the combined decoding for the first code block is decided by the first-type communication node autonomously.

In one embodiment, the phrase that "when channel decoding of the first radio signal is failed, the first radio signal can be excluded from being used for combined decoding for the first code block" means that when channel decoding of the first radio signal is failed, whether the first radio signal is used for the combined decoding for the first code block is dependent on implementation of the first-type communication node.

In one embodiment, the phrase that "when channel decoding of the first radio signal is failed, the first radio signal can be excluded from being used for combined decoding for the first code block" includes: when channel decoding of the first radio signal is failed, the first radio signal is certainly not used for the combined decoding for the first code block.

In one embodiment, the phrase that "when channel decoding of the first radio signal is failed, the first radio signal can be excluded from being used for combined decoding for the first code block" includes: when channel decoding of the first radio signal is failed, the first radio signal can potentially be used for the combined decoding for the first code block.

In one embodiment, whether being used for combined decoding for the first code block refers to whether being used for a HARQ of the first code block.

In one embodiment, whether being used for combined decoding for the first code block refers to whether performing soft buffer on the first code block.

In one embodiment, the combined decoding refers to channel decoding based on Soft Combining.

In one embodiment, the combined decoding refers to channel decoding based on Chase Combining.

In one embodiment, the combined decoding refers to channel decoding based on Incremental Redundancy (IR).

In one embodiment, the combined decoding refers to channel decoding based on Incremental Redundancy (IR) and Chase Combining.

In one embodiment, the air interface is wireless.

In one embodiment, the air interface comprises a wireless channel.

In one embodiment, the air interface is an interface between a second-type communication node and the first-type communication node.

In one embodiment, the air interface is a Uu interface.

Embodiment 2

Figure 2:
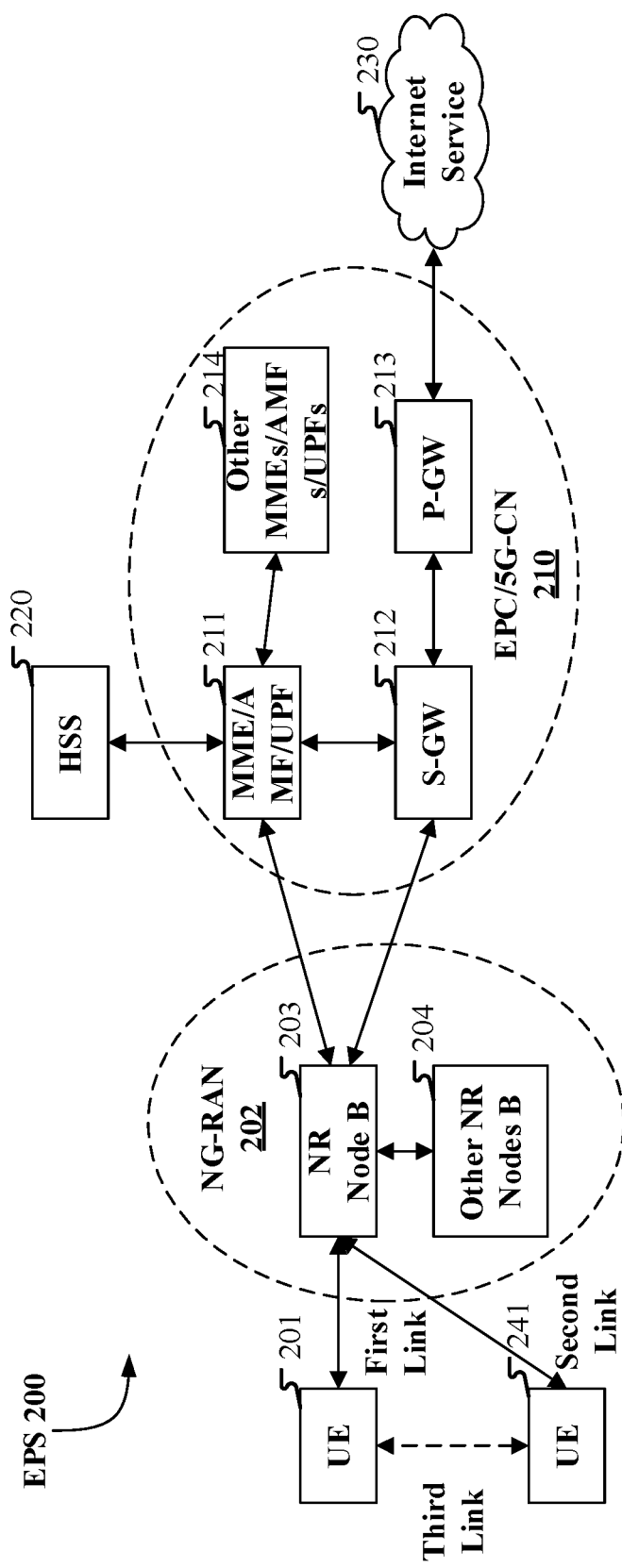
FIG. 2 illustrates a schematic diagram of a network architecture according to one embodiment of the present disclosure.

Embodiment 2 illustrates a schematic diagram of a network architecture, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201/241, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN, a gNB 203 may be a satellite, an aircraft or a terrestrial base station relayed via satellites. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Satellite Mobile Communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first-type communication node in the present disclosure.

In one embodiment, the UE 201 supports communications within NTN.

In one embodiment, the gNB 203 corresponds to the second-type communication node in the present disclosure.

In one embodiment, the gNB 203 communications within NTN.

Embodiment 3

Figure 3:
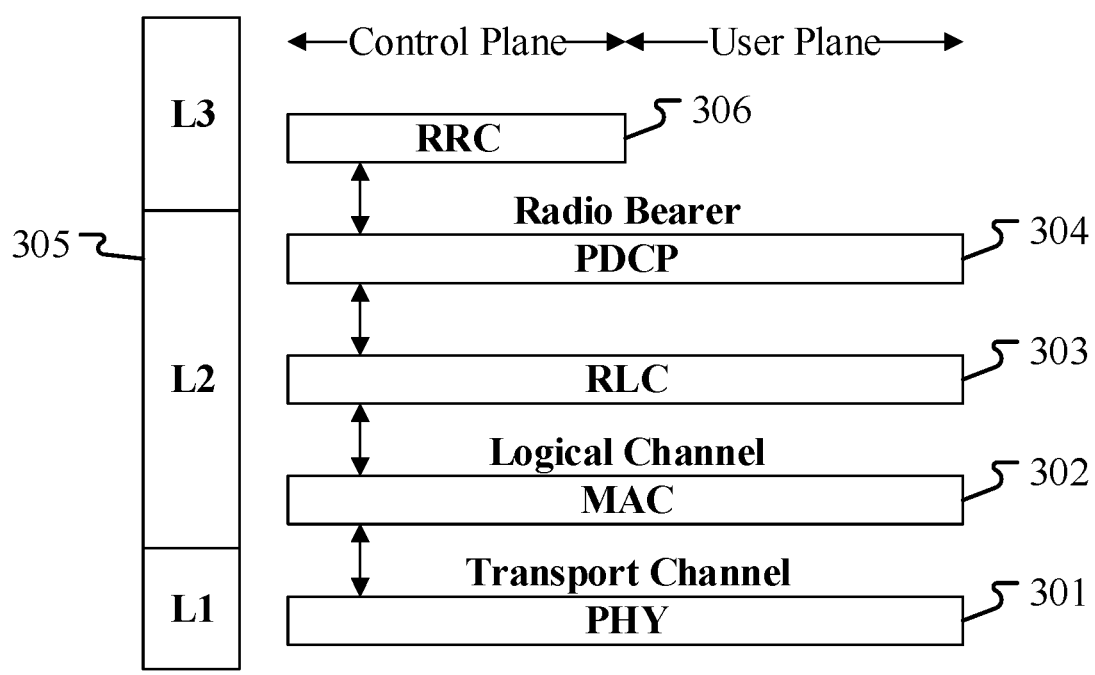
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3. In FIG. 3, the radio protocol architecture for a first-type communication node (UE) and a second-type communication node (gNB, eNB, or, a satellite or an aircraft in NTN) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first-type communication node and the second-type communication node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second-type communication nodes of the network side. Although not described in FIG. 3, the first-type communication node may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for handover of first-type communication nodes between second-type communication nodes. The RLC sublayer 303 provides segmentation and reassembling of a higher-layer packet, retransmission of a lost packet, and reordering of a packet so as to compensate disordered receiving caused by HARQ. The MAC sublayer 302 provides multiplexing between a logical channel and a transport channel. The MAC sublayer 302 is also responsible for allocating between first-type communication nodes various radio resources (i.e., resource blocks) in a cell. The MAC sublayer 302 is also in charge of HARQ operation. In the control plane, the radio protocol architecture of the first-type communication node and the second-type communication node is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the second-type communication node and the first-type communication node.

In one embodiment, the radio protocol architecture in FIG. 3 is applicable to the first-type communication node in the present disclosure.

In one embodiment, the radio protocol architecture in FIG. 3 is applicable to the second-type communication node in the present disclosure.

In one embodiment, the first information in the present disclosure is generated by the RRC 306.

In one embodiment, the first information in the present disclosure is generated by the MAC 302.

In one embodiment, the first information in the present disclosure is generated by the PHY 301.

In one embodiment, the first signaling in the present disclosure is generated by the RRC 306.

In one embodiment, the first signaling in the present disclosure is generated by the PHY 301.

In one embodiment, the first radio signal in the present disclosure is generated by the RRC 306.

In one embodiment, the first radio signal in the present disclosure is generated by the MAC 302.

In one embodiment, the first radio signal in the present disclosure is generated by the PHY 301.

In one embodiment, the second radio signal in the present disclosure is generated by the RRC 306.

In one embodiment, the second radio signal in the present disclosure is generated by the MAC 302.

In one embodiment, the second radio signal in the present disclosure is generated by the PHY 301.

In one embodiment, the second information in the present disclosure is generated by the RRC 306.

In one embodiment, the second information in the present disclosure is generated by the MAC 302.

In one embodiment, the second information in the present disclosure is generated by the PHY 301.

In one embodiment, the second signaling in the present disclosure is generated by the RRC 306.

In one embodiment, the second signaling in the present disclosure is generated by the PHY 301.

In one embodiment, the third information in the present disclosure is generated by the RRC 306.

In one embodiment, the third information in the present disclosure is generated by the MAC 302.

In one embodiment, the third information in the present disclosure is generated by the PHY 301.

In one embodiment, the third signaling in the present disclosure is generated by the RRC 306.

In one embodiment, the third signaling in the present disclosure is generated by the PHY 301.

Embodiment 4

Figure 4:
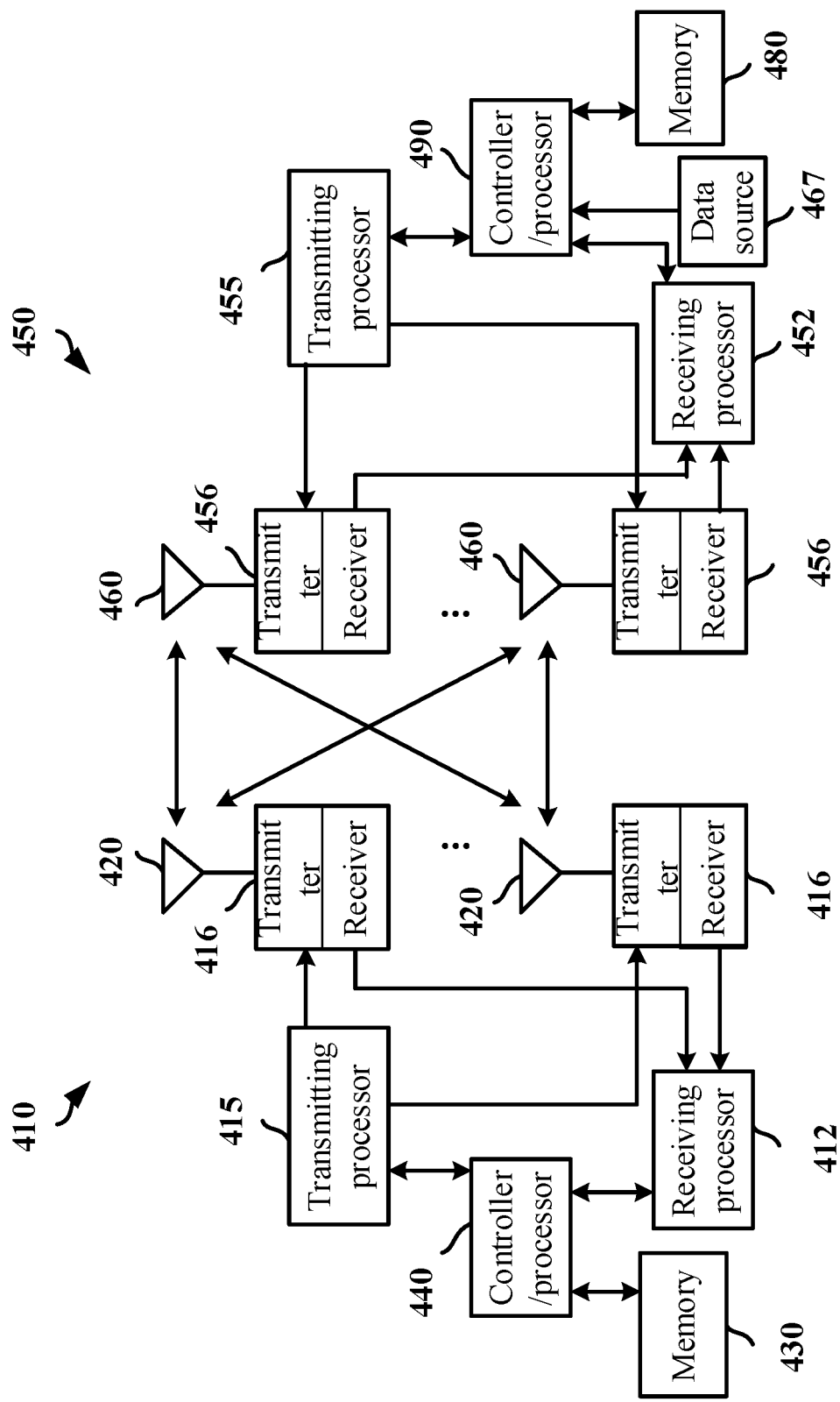
FIG. 4 illustrates a schematic diagram of a first-type communication node and a second-type communication node according to one embodiment of the present disclosure.

Embodiment 4 illustrates a schematic diagram of a base station and a given UE according to the present disclosure, as shown in FIG. 4. FIG. 4 is a block diagram of a gNB/eNB 410 in communication with a UE 450 in an access detection.

The UE 450 comprises a controller/processor 490, a memory 480, a receiving processor 452, a transmitter/receiver 456 and a transmitting processor 455, and a data source 467, wherein the transmitter/receiver 456 comprises an antenna 460. The data source 467 provides a higher layer packet to the controller/processor 490, the controller/processor 490 provides header compression and decompression, encryption and decryption, packet segmentation and reordering as well as multiplexing and demultiplexing between a logical channel and a transport channel so as to implement protocols for the L2 layer used for user plane and control plane. The higher layer packet may comprise data or control information, such as DL-SCH or UL-SCH. The transmitting processor 455 provides various signal transmitting processing functions used for the L1 layer (i.e., PHY), including coding, interleaving, scrambling, modulating, power control/allocation, precoding and physical layer control signaling generation. The receiving processor 452 provides various signaling receiving processing functions used for the L1 layer (i.e., PHY), including decoding, de-interleaving, de-scrambling, demodulating, de-precoding and physical layer control signaling extraction. The transmitter 456 is configured to convert a baseband signal provided by the transmitting processor 455 into a radio frequency (RF) signal to be transmitted via the antenna 460. The receiver 456 converts the RF signal received via the antenna 460 into a baseband signal and provides the baseband signal to the receiving processor 452.

The base station 410 may comprise a controller/processor 440, a memory 430, a receiving processor 412, a transmitter/receiver 416 and a transmitting processor 415, wherein the transmitter/receiver 416 comprises an antenna 420. A higher-layer packet is provided to the controller/processor 440; the controller/processor 440 provides header compression and decompression, encryption and decryption, packet segmentation and reordering and multiplexing and demultiplexing between a logical channel and a transport channel so as to implement the L2 protocols for a user plane and a control plane. The higher layer packet may comprise data or control information, such as DL-SCH or UL-SCH. The transmitting processor 415 provides various signal transmitting processing functions used for the L1 layer (i.e., PHY), including coding, interleaving, scrambling, modulating, power control/allocation, precoding and physical layer control signaling (including synchronization signal and reference signal) generation. The receiving processor 412 provides various signaling receiving processing functions used for the L1 layer (i.e., PHY), including decoding, de-interleaving, de-scrambling, demodulating, de-precoding and physical layer control signaling extraction. The transmitter 416 is configured to convert a baseband signal provided by the transmitting processor 415 into a radio frequency (RF) signal to be transmitted via the antenna 420. The receiver 416 converts the RF signal received via the antenna 420 into a baseband signal and provides the baseband signal to the receiving processor 412.

In Downlink (DL) transmission, a higher-layer packet, as carried by the first radio signal and the second radio signal in the present disclosure, is provided to the controller/processor 440. The controller/processor 440 implements the functionality of the L2 layer. In DL, the controller/processor 440 provides header compression, encryption, packet segmentation and reordering, multiplexing between a logical channel and a transport channel, as well as radio resources allocation of the UE 450 based on various priorities. The controller/processor 440 is also in charge of HARQ operation, retransmission of a lost packet and a signaling to the UE 450, for instance, the first information and the third information, all or part of the first signaling as well as all or part of the second signaling in the present disclosure are all generated in the controller/processor 440. The transmitting processor 415 provides various signal-processing functions for the L1 layer (that is, PHY), including decoding and interleaving to ensure Forward Error Correction (FEC) at the UE 450 as well as modulating a baseband signal based on each modulation scheme (for example, BPSK, QPSK). Modulation symbols are divided into parallel streams and each stream is mapped onto a corresponding multicarrier subcarrier and/or a multicarrier symbol, which is later mapped from the transmitting processor 415 to the antenna 420 via the transmitter 416 in the form of a radio frequency signal. Corresponding physical-layer channels of a first signaling, a second signaling, first information and third information in the present disclosure are respectively mapped from the transmitting processor 415 to a target radio resource and then mapped from the transmitter 416 to the antenna 420 to be transmitted in the form of radio frequency signals. At the receiving side, each receiver 456 receives the radio frequency signal via a corresponding antenna 460, and recovers baseband information modulated onto a radio frequency carrier and provides the baseband information to the receiving processor 452. The receiving processor 452 provides various signal receiving functions for the L1 layer. The functions include receiving the first signaling, the second signaling, and physical-layer signals carrying the first information and the third information of the present disclosure. Multicarrier symbols in multicarrier symbol streams are demodulated based on varied modulation schemes (i.e., BPSCK, QPSK), and are then decoded and de-interleaved to recover data or control signal transmitted by the gNB 410 on a physical channel. Determination of the combined decoding in the present disclosure is completed in the receiving processor 452. And the data and control signal are provided to the controller/processor 490. The controller/processor 490 is in charge of the L2 layer functionality. The controller/processor 490 interprets the first information, the third information, the first radio signal and the second radio signal in the present disclosure, if any. The controller/processor 490 may be associated with the memory 480 that stores program codes and data. The memory 480 can be called a computer readable medium.

In Uplink (UL) transmission, the data source 467 is used for providing signal-relevant configuration data to the controller/processor 490. The data source 467 represents all protocol layers above the L2 layer. The controller/processor 490 provides header compression, encryption, packet segmentation and reordering as well as multiplexing between a logical channel and a transport channel based on radio resources allocation of the gNB 410 so as to implement L2 layer protocols used for the user plane and the control plane.

The controller/processor 490 is also in charge of HARQ operation, retransmission of a lost packet, and a signaling (comprising second information and part or all of a third signaling) to the gNB 410. The transmitting processor 455 provides various signal transmitting processing functions used for the L1 layer (that is, PHY), including coding and modulating. Modulation symbols are divided into parallel streams and each of them is mapped onto a corresponding multicarrier subcarrier and/or multicarrier symbol for baseband signal generation, which is later mapped from the transmitting processor 455 to the antenna 460 via the transmitter 456 in the form of a radio frequency signal. Physical layer signals of the present disclosure, including a physical-layer signal corresponding to the second information and the third signaling, are generated in the transmitting processor 455. The receiver 416 receives the radio frequency signal via a corresponding antenna 420. Each receiver 416 recovers baseband information modulated onto radio frequency carrier and provides the baseband information to the receiving processor 412. The receiving processor 412 provides various signal receiving processing functions used for the L1 layer (that is, PHY), including receiving a physical layer signal of the second information and the third signaling of the present disclosure. The signal receiving processing functions also include acquiring multicarrier symbol streams, demodulating multicarrier symbols in the multicarrier symbol streams based on each modulation scheme (e.g., BPSK, QPSK), and decoding to recover data and/or control signal originally transmitted by the UE 450 on a physical channel. After that data and/or control signal are provided to the controller/processor 440. The controller/processor 440 implements the functionality of the L2 layer. The controller/processor 440 can be associated with the memory 430 that stores program codes and data. The memory 430 can be a computer readable medium.

In one embodiment, the UE 450 corresponds to the first-type communication node in the present disclosure.

In one embodiment, the gNB 410 corresponds to the second-type communication node in the present disclosure.

In one embodiment, the UE 450 comprises at least one processor and at least one memory. The at least one memory comprises computer program codes; the at least one memory and the computer program codes are configured to be used in collaboration with the at least one processor. The UE 450 at least receives first information, the first information being used to determine a target time-frequency resource pool; monitors a first signaling; and receives a first radio signal when the first signaling is detected; herein, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface.

In one embodiment, the UE 450 comprises a memory that stores a computer readable instruction program. The computer readable instruction program generates actions when executed by at least one processor, which include: receiving first information, the first information being used to determine a target time-frequency resource pool; monitoring a first signaling; and receiving a first radio signal when the first signaling is detected; herein, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface.

In one embodiment, the gNB 410 comprises at least one processor and at least one memory. The at least one memory comprises computer program codes. The at least one memory and the computer program codes are configured to be used in collaboration with the at least one processor. The gNB 410 at least transmits first information, the first information being used to determine a target time-frequency resource pool; transmits a first signaling; and transmits a first radio signal; herein, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface.

In one embodiment, the gNB 410 comprises a memory that stores a computer readable instruction program. The computer readable instruction program generates actions when executed by at least one processor, which include: transmitting first information, the first information being used to determine a target time-frequency resource pool; transmitting a first signaling; and transmitting a first radio signal; herein, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface.

In one embodiment, the receiver 456 (comprising the antenna 460), the receiving processor 452 and the controller/processor 490 are used to receive the first information in the present disclosure.

In one embodiment, the receiver 456 (comprising the antenna 460), the receiving processor 452 and the controller/processor 490 are used to receive the first radio signal in the present disclosure.

In one embodiment, the receiver 456 (comprising the antenna 460), the receiving processor 452 and the controller/processor 490 are used to receive the first signaling in the present disclosure.

In one embodiment, the receiver 456 (comprising the antenna 460) and the receiving processor 452 are used to receive the first signaling in the present disclosure.

In one embodiment, the receiver 456 (comprising the antenna 460), the receiving processor 452 and the controller/processor 490 are used to receive the second signaling in the present disclosure.

In one embodiment, the receiver 456 (comprising the antenna 460) and the receiving processor 452 are used to receive the second signaling in the present disclosure.

In one embodiment, the receiver 456 (comprising the antenna 460), the receiving processor 452 and the controller/processor 490 are used to receive the second radio signal in the present disclosure.

In one embodiment, the receiver 456 (comprising the antenna 460), the receiving processor 452 and the controller/processor 490 are used to receive the third information in the present disclosure.

In one embodiment, the transmitter 456 (comprising the antenna 460), the transmitting processor 455 and the controller/processor 490 are used to transmit the second information in the present disclosure.

In one embodiment, the transmitter 456 (comprising the antenna 460), the transmitting processor 455 and the controller/processor 490 are used to transmit the third signaling in the present disclosure.

In one embodiment, the transmitter 456 (comprising the antenna 460) and the transmitting processor 455 are used to transmit the third signaling in the present disclosure.

In one embodiment, the transmitter 416 (comprising the antenna 420), the transmitting processor 415 and the controller/processor 440 are used to transmit the first information in the present disclosure.

In one embodiment, the transmitter 416 (comprising the antenna 420), the transmitting processor 415 and the controller/processor 440 are used to transmit the first radio signal in the present disclosure.

In one embodiment, the transmitter 416 (comprising the antenna 420), the transmitting processor 415 and the controller/processor 440 are used to transmit the first signaling in the present disclosure.

In one embodiment, the transmitter 416 (comprising the antenna 420) and the transmitting processor 415 are used to transmit the first signaling in the present disclosure.

In one embodiment, the transmitter 416 (comprising the antenna 420), the transmitting processor 415 and the controller/processor 440 are used to transmit the second signaling in the present disclosure.

In one embodiment, the transmitter 416 (comprising the antenna 420) and the transmitting processor 415 are used to transmit the second signaling in the present disclosure.

In one embodiment, the transmitter 416 (comprising the antenna 420), the transmitting processor 415 and the controller/processor 440 are used to transmit the second radio signal.

In one embodiment, the transmitter 416 (comprising the antenna 420), the transmitting processor 415 and the controller/processor 440 are used to transmit the third information.

In one embodiment, the receiver 416 (comprising the antenna 420), the receiving processor 412 and the controller/processor 440 are used to receive the second information in the present disclosure.

In one embodiment, the receiver 416 (comprising the antenna 420), the receiving processor 412 and the controller/processor 440 are used to receive the third signaling in the present disclosure.

In one embodiment, the receiver 416 (comprising the antenna 420) and the receiving processor 412 are used to receive the third signaling in the present disclosure.

Embodiment 5

Figure 5:
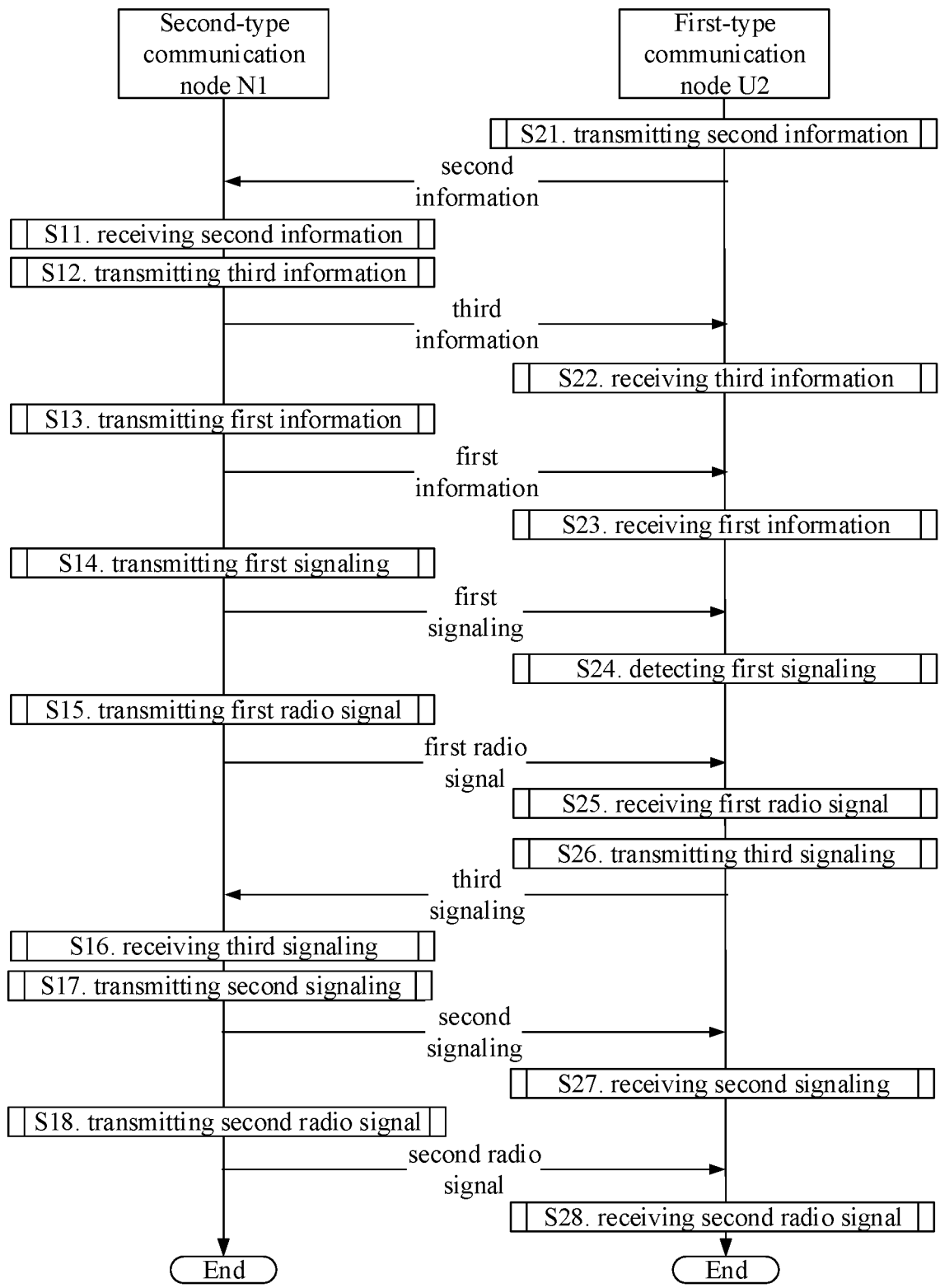
FIG. 5 illustrates a flowchart of a radio signal transmission according to one embodiment of the present disclosure.

Embodiment 5 illustrates a flowchart of a radio signal transmission according to one embodiment of the present disclosure, as shown in FIG. 5. In FIG. 5, a second-type communication node N1 is a maintenance base station for a serving cell of a first-type communication node U2.

The second-type communication node N1 receives second information in step S11, transmits third information in step S12, and transmits first information in step S13, transmits a first signaling in step S14, transmits a first radio signal in step S15, and receives a third signaling in step S16, transmits a second signaling in step S17, and transmits a second radio signal in step S18.

The first-type communication node U2 transmits second information in step S21, receives third information in step S22, and receives first information in step S23, detects a first signaling in step S24, receives a first radio signal in step S25, and transmits a third signaling in step S26, receives a second signaling in step S27, and receives a second radio signal in step S28.

In Embodiment 5, the first information is used to determine a target time-frequency resource pool, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface; the first code block goes through channel coding to output a first bit block, and X1 bit(s) in the first bit block is(are) used to generate the first radio signal, the first bit block comprising no fewer than X1 bit(s), X1 being a positive integer; the second signaling is used to determine X2 bit(s) in the first bit block, the X2 bit(s) being used to generate the second radio signal; of the X1 bit(s) and the X2 bit(s) only the X2 bit(s) is(are) used for decoding of the first code block; the second signaling is transmitted via the air interface; the third signaling is used to indicate whether channel decoding of the first radio signal is failed, the third signaling being transmitted via the air interface; the second information is used to indicate a capability of combined decoding of a receiver of the first radio signal, the second information being transmitted via the air interface; the third information is used to determine a first time-frequency resource pool, and time-frequency resources occupied by the first signaling belong to the first time-frequency resource pool, and all time-frequency resources in the target time-frequency resource pool belong to the first time-frequency resource pool, the third information being transmitted via the air interface.

In one embodiment, the target time-frequency resource pool comprises K candidate time-frequency resource(s), and the channel decoding of the first radio signal is failed; whether the first time-frequency resource belongs to one of the K candidate time-frequency resource(s) is used to determine whether the first radio signal can be excluded from being used for the combined decoding for the first code block, or whether the second time-frequency resource belongs to one of the K candidate time-frequency resource(s) is used to determine whether the first radio signal can be excluded from being used for the combined decoding for the first code block; K is a positive integer.

In one embodiment, the first signaling is used to indicate time-frequency resources occupied by the first radio signal, and a number of resource elements comprised in the time-frequency resources occupied by the first radio signal is used to determine a number of bits comprised in the first code block.

In one embodiment, a start time of transmitting the second signaling is later than a start time of transmitting the first radio signal.

In one embodiment, a start time of transmitting the second signaling is later than an end time of transmitting the first radio signal.

In one embodiment, the second signaling is transmitted through a PDCCH.

In one embodiment, the second signaling is all or part of fields in a DCI signaling.

In one embodiment, the second signaling is a physical layer signaling.

In one embodiment, the second signaling is a higher-layer signaling.

In one embodiment, the second signaling is all or part of IEs in an RRC signaling.

In one embodiment, the second signaling is a signaling indicating time-frequency resources that cannot be occupied by the first radio signal.

In one embodiment, the second signaling is used by the first-type communication node to determine the X2 bit(s) in the first bit block.

In one embodiment, the second signaling is indirectly used by the first-type communication node to determine the X2 bit(s) in the first bit block.

In one embodiment, the second signaling is directly used by the first-type communication node to determine the X2 bit(s) in the first bit block.

In one embodiment, the second signaling explicitly indicates the X2 bit(s) in the first bit block.

In one embodiment, the second signaling implicitly indicates the X2 bit(s) in the first bit block.

In one embodiment, the second signaling indicates a Redundancy Version (RV) of the second radio signal, and the RV of the second radio signal is used to determine the X2 bit(s) in the first bit block.

In one embodiment, there is a field in the second signaling being used to indicate a process ID of a HARQ process to which the second radio signal belongs.

In one embodiment, there isn't any field in the second signaling being used to indicate a process ID of a HARQ process to which the second radio signal belongs.

In one embodiment, there is a field in the second signaling that indicates a process ID of a HARQ process to which the second radio signal belongs, and the process ID of the HARQ process to which the second radio signal belongs exceeds a maximum HARQ process ID that can be supported.

In one embodiment, there is a field in the second signaling that indicates a process ID of a HARQ process to which the second radio signal belongs, and the process ID of the HARQ process to which the second radio signal belongs exceeds a maximum number of HARQ processes that can be supported reduced by 1.

In one embodiment, the first signaling comprises a first field, and the first field is used to indicate a HARQ process ID for the first radio signal; the second signaling comprises a second field, and the second field is used to indicate a HARQ process ID for the second radio signal; the first field is equivalent to the second field.

In one embodiment, the third signaling is a physical-layer signaling.

In one embodiment, the third signaling is a higher-layer signaling.

In one embodiment, the third signaling is all or part of IEs in an RRC signaling.

In one embodiment, the third signaling is transmitted through a Physical Uplink Control Channel (PUCCH).

In one embodiment, the third signaling is transmitted through a Physical Uplink Shared Channel (PUSCH).

In one embodiment, the third signaling is transmitted through Piggyback of a Physical Uplink Shared Channel (PUSCH).

In one embodiment, the third signaling carries Uplink Control Information (UCI).

In one embodiment, the third signaling comprises all or part of fields in a piece of UCI.

In one embodiment, the third signaling carries ACK/NACK (A/N) Feedback information.

In one embodiment, the phrase that the third signaling is used to indicate whether channel decoding of the first radio signal is failed means that the third signaling is used for directly indicating whether the channel decoding of the first radio signal is failed.

In one embodiment, the phrase that the third signaling is used to indicate whether channel decoding of the first radio signal is failed means that the third signaling is used for indirectly indicating whether the channel decoding of the first radio signal is failed.

In one embodiment, the phrase that the third signaling is used to indicate whether channel decoding of the first radio signal is failed means that the third signaling is used for explicitly indicating whether the channel decoding of the first radio signal is failed.

In one embodiment, the phrase that the third signaling is used to indicate whether channel decoding of the first radio signal is failed means that the third signaling is used for implicitly indicating whether the channel decoding of the first radio signal is failed.

In one embodiment, the phrase that the third signaling is used to indicate whether channel decoding of the first radio signal is failed means that the third signaling is used for carrying ACK/NACK (A/N) Feedback for the first radio signal.

Embodiment 6

Figure 6:
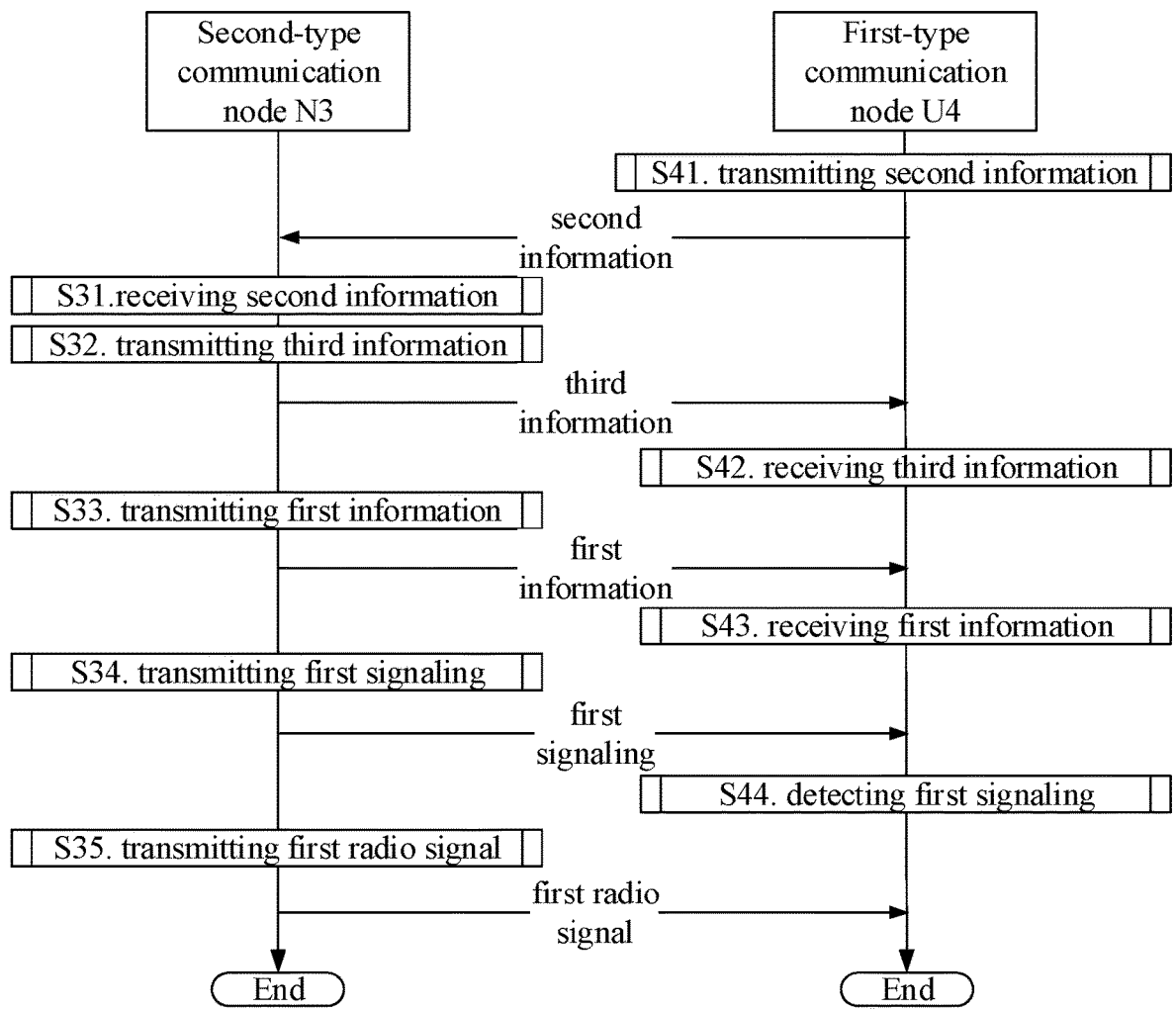
FIG. 6 illustrates a flowchart of a radio signal transmission according to another embodiment of the present disclosure.

Embodiment 6 illustrates a flowchart of a radio signal transmission according to another embodiment of the present disclosure, as shown in FIG. 6. In FIG. 6, a second-type communication node N3 is a maintenance base station for a serving cell of a first-type communication node U4.

The second-type communication node N3 receives second information in step S31, transmits third information in step S32, and transmits first information in step S33, transmits a first signaling in step S34, and transmits a first radio signal in step S35.

The first-type communication node U4 transmits second information in step S41, receives third information in step S42, receives first information in step S43, and detects a first signaling in step S44.

In Embodiment 6, the first information is used to determine a target time-frequency resource pool, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface; the first code block goes through channel coding to output a first bit block, and X1 bit(s) in the first bit block is(are) used to generate the first radio signal, the first bit block comprising no fewer than X1 bit(s), X1 being a positive integer; the second signaling is used to determine X2 bit(s) in the first bit block, the X2 bit(s) being used to generate the second radio signal; of the X1 bit(s) and the X2 bit(s) only the X2 bit(s) is(are) used for decoding of the first code block; the second signaling is transmitted via the air interface; the third signaling is used to indicate whether channel decoding of the first radio signal is failed, the third signaling being transmitted via the air interface; the second information is used to indicate a capability of combined decoding of a receiver of the first radio signal, the second information being transmitted via the air interface; the third information is used to determine a first time-frequency resource pool, and time-frequency resources occupied by the first signaling belong to the first time-frequency resource pool, and all time-frequency resources in the target time-frequency resource pool belong to the first time-frequency resource pool, the third information being transmitted via the air interface.

In one embodiment, the target time-frequency resource pool comprises K candidate time-frequency resource(s), and the channel decoding of the first radio signal is failed; whether the first time-frequency resource belongs to one of the K candidate time-frequency resource(s) is used to determine whether the first radio signal can be excluded from being used for the combined decoding for the first code block, or whether the second time-frequency resource belongs to one of the K candidate time-frequency resource(s) is used to determine whether the first radio signal can be excluded from being used for the combined decoding for the first code block; K is a positive integer.

In one embodiment, the first signaling is used to indicate time-frequency resources occupied by the first radio signal, and a number of resource elements comprised in the time-frequency resources occupied by the first radio signal is used to determine a number of bits comprised in the first code block.

In one embodiment, the second information is transmitted via a higher-layer signaling.

In one embodiment, the second information is transmitted via a physical-layer signaling.

In one embodiment, the second information comprises all or part of a higher-layer signaling.

In one embodiment, the second information comprises all or part of a physical-layer signaling.

In one embodiment, the second information is transmitted through a Physical Uplink Shared Channel (PUSCH).

In one embodiment, the second information is carried via a Physical Random Access Channel (PRACH).

In one embodiment, the second information is transmitted in a random access procedure.

In one embodiment, the second information comprises all or part of an RRC signaling.

In one embodiment, the second information is unicast.

In one embodiment, the second information comprises UE Capability report.

In one embodiment, the phrase that the second information is used to indicate a capability of combined decoding of a receiver of the first radio signal means that the second information is used for directly indicating the capability of combined decoding of the receiver of the first radio signal.

In one embodiment, the phrase that the second information is used to indicate a capability of combined decoding of a receiver of the first radio signal means that the second information is used for indirectly indicating the capability of combined decoding of the receiver of the first radio signal.

In one embodiment, the phrase that the second information is used to indicate a capability of combined decoding of a receiver of the first radio signal means that the second information is used for explicitly indicating the capability of combined decoding of the receiver of the first radio signal.

In one embodiment, the phrase that the second information is used to indicate a capability of combined decoding of a receiver of the first radio signal means that the second information is used for implicitly indicating the capability of combined decoding of the receiver of the first radio signal.

In one embodiment, a capability of combined decoding of a receiver of the first radio signal refers to a capability of soft buffer of the receiver of the first radio signal.

In one embodiment, a capability of combined decoding of a receiver of the first radio signal refers to a capability of decoding of the receiver of the first radio signal.

In one embodiment, a capability of combined decoding of a receiver of the first radio signal refers to a maximum number of soft bits stored by the receiver of the first radio signal.

In one embodiment, a capability of combined decoding of a receiver of the first radio signal refers to a maximum number of bits in cyclic buffer supported by the receiver of the first radio signal when performing channel decoding.

In one embodiment, a capability of combined decoding of a receiver of the first radio signal refers to a capability of supporting a maximum decoding complexity of the receiver of the first radio signal when performing channel decoding.

In one embodiment, the third information is transmitted via a higher-layer signaling.

In one embodiment, the third information is transmitted via a physical-layer signaling.

In one embodiment, the third information comprises all or part of a higher-layer signaling.

In one embodiment, the third information comprises all or part of a physical-layer signaling.

In one embodiment, the third information is transmitted through a Physical Broadcast Channel (PBCH).

In one embodiment, the third information comprises one or more fields in a MIB.

In one embodiment, the third information is transmitted through a DL-SCH.

In one embodiment, the third information is transmitted through a PDSCH.

In one embodiment, the third information comprises one or more fields in a SIB.

In one embodiment, the third information comprises one or more fields in Remaining System Information (RMSI).

In one embodiment, the third information comprises all or part of an RRC signaling.

In one embodiment, the third information is broadcast.

In one embodiment, the third information is unicast.

In one embodiment, the third information is Cell Specific.

In one embodiment, the third information is UE-specific.

In one embodiment, the third information is transmitted through a PDCCH.

In one embodiment, the third information comprises all or part of fields in a DCI signaling.

In one embodiment, the phrase that the third information is used to determine the first time-frequency resource pool means that the third information is used for directly indicating the first time-frequency resource pool.

In one embodiment, the phrase that the third information is used to determine the first time-frequency resource pool means that the third information is used for indirectly indicating the first time-frequency resource pool.

In one embodiment, the phrase that the third information is used to determine the first time-frequency resource pool means that the third information is used for explicitly indicating the first time-frequency resource pool.

In one embodiment, the phrase that the third information is used to determine the first time-frequency resource pool means that the third information is used for implicitly indicating the first time-frequency resource pool.

In one embodiment, the third information comprises Information Element (IE) "ControlResourceSet" in 3 GPP TS 38.331 (v15.1.0).

In one embodiment, the third information comprises Information Element (IE) "SearchSpace" in 3GPP TS38.331 (v15.1.0).

Embodiment 7

Figure 7:
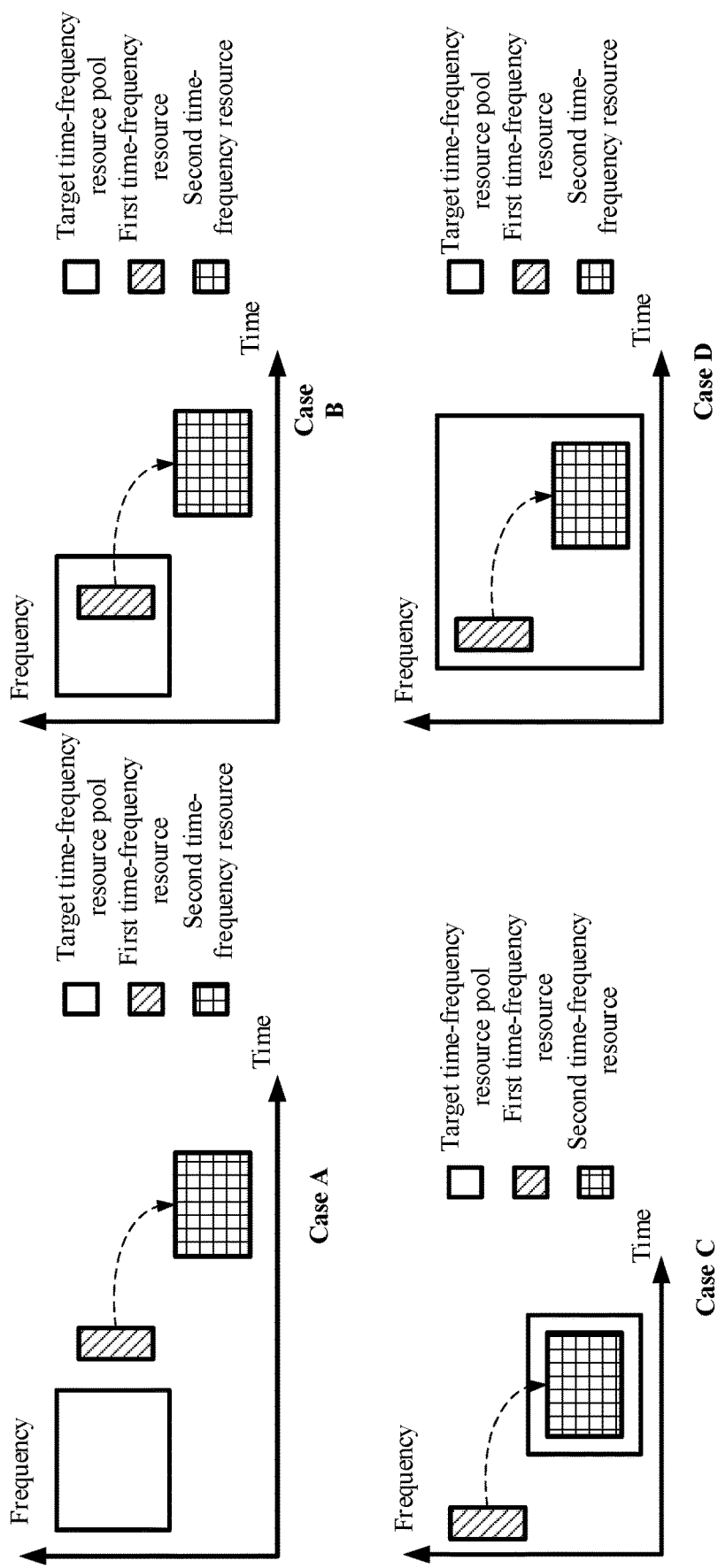
FIG. 7 illustrates a schematic diagram of how a target time-frequency resource pool relates to a first time-frequency resource and a second time-frequency resource according to one embodiment of the present disclosure.

Embodiment 7 illustrates a schematic diagram of how a target time-frequency resource pool relates to a first time-frequency resource and a second time-frequency resource according to one embodiment of the present disclosure, as shown in FIG. 7. In FIG. 7, the blank box represents a target time-frequency resource pool, the slash-filled box represents a first time-frequency resource, and the grid-filled box represents a second time-frequency resource; Case A, Case B, Case C and Case D respectively illustrate how the target time-frequency resource pool relates to the first time-frequency resource and the second time-frequency resource on four occasions.

In Embodiment 7, a first code block is used to generate the first radio signal in the present disclosure, and the first code block comprises a positive integer number of bit(s); time-frequency resources occupied by the first signaling in the present disclosure comprise a first time-frequency resource, while time-frequency resources occupied by the first radio signal in the present disclosure comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool.

In one embodiment, whether the first radio signal can be excluded from being used for combined decoding for the first code block is only dependent on whether the first time-frequency resource belongs to the target time-frequency resource pool.

In one embodiment, whether the first radio signal can be excluded from being used for combined decoding for the first code block is also dependent on factors other than whether the first time-frequency resource belongs to the target time-frequency resource pool.

In one embodiment, whether the first radio signal can be excluded from being used for combined decoding for the first code block is only dependent on whether the second time-frequency resource belongs to the target time-frequency resource pool.

In one embodiment, whether the first radio signal can be excluded from being used for combined decoding for the first code block is also dependent on factors other than whether the second time-frequency resource belongs to the target time-frequency resource pool.

In one embodiment, whether the first radio signal can be excluded from being used for combined decoding for the first code block is dependent on whether the first time-frequency resource belongs to the target time-frequency resource pool and whether the second time-frequency resource belongs to the target time-frequency resource pool.

In one embodiment, the phrase that whether the first radio signal can be excluded from being used for combined decoding for the first code block is dependent on whether the first time-frequency resource belongs to the target time-frequency resource pool means that the first radio signal can be excluded from being used for combined decoding for the first code block and whether the first time-frequency resource belongs to the target time-frequency resource pool correspond to each other.

In one embodiment, the phrase that whether the first radio signal can be excluded from being used for combined decoding for the first code block is dependent on whether the first time-frequency resource belongs to the target time-frequency resource pool means that whether the first radio signal can be excluded from being used for combined decoding for the first code block corresponds to whether the first time-frequency resource belongs to the target time-frequency resource pool based on a given mapping relation.

In one embodiment, the phrase that whether the first radio signal can be excluded from being used for combined decoding for the first code block is dependent on whether the first time-frequency resource belongs to the target time-frequency resource pool means that whether the first time-frequency resource belongs to the target time-frequency resource pool is used to determine whether the first radio signal can be excluded from being used for combined decoding for the first code block.

In one embodiment, the phrase that whether the first radio signal can be excluded from being used for combined decoding for the first code block is dependent on whether the second time-frequency resource belongs to the target time-frequency resource pool means that the first radio signal can be excluded from being used for combined decoding for the first code block and whether the second time-frequency resource belongs to the target time-frequency resource pool correspond to each other.

In one embodiment, the phrase that whether the first radio signal can be excluded from being used for combined decoding for the first code block is dependent on whether the second time-frequency resource belongs to the target time-frequency resource pool means that whether the first radio signal can be excluded from being used for combined decoding for the first code block corresponds to whether the second time-frequency resource belongs to the target time-frequency resource pool based on a given mapping relation.

In one embodiment, the phrase that whether the first radio signal can be excluded from being used for combined decoding for the first code block is dependent on whether the second time-frequency resource belongs to the target time-frequency resource pool means that whether the second time-frequency resource belongs to the target time-frequency resource pool is used to determine whether the first radio signal can be excluded from being used for combined decoding for the first code block.

In one embodiment, the phrase that whether the first radio signal can be excluded from being used for combined decoding for the first code block is dependent on whether the first time-frequency resource belongs to the target time-frequency resource pool means that when the first time-frequency resource belongs to the target time-frequency resource pool, the first radio signal can be excluded from being used for combined decoding for the first code block; when the first time-frequency resource comprises time-frequency resources outside the target time-frequency resource pool, the first radio signal is used for the combined decoding for the first code block.

In one embodiment, the phrase that whether the first radio signal can be excluded from being used for combined decoding for the first code block is dependent on whether the first time-frequency resource belongs to the target time-frequency resource pool means that when the first time-frequency resource belongs to the target time-frequency resource pool, the first radio signal is used for the combined decoding for the first code block; when the first time-frequency resource comprises time-frequency resources outside the target time-frequency resource pool, the first radio signal can be excluded from being used for combined decoding for the first code block.

In one embodiment, the phrase that whether the first radio signal can be excluded from being used for combined decoding for the first code block is dependent on whether the first time-frequency resource belongs to the target time-frequency resource pool means that when the first time-frequency resource belongs to the target time-frequency resource pool, a HARQ of the first radio signal can be switched-off (deactive or off); when the first time-frequency resource comprises time-frequency resources outside the target time-frequency resource pool, a HARQ of the first radio signal is switched-on (active or on), which is used for combined decoding for the first code block.

In one embodiment, the phrase that whether the first radio signal can be excluded from being used for combined decoding for the first code block is dependent on whether the first time-frequency resource belongs to the target time-frequency resource pool means that when the first time-frequency resource belongs to the target time-frequency resource pool, a HARQ of the first radio signal is switched-on (active or on); when the first time-frequency resource comprises time-frequency resources outside the target time-frequency resource pool, a HARQ of the first radio signal can be switched-off (deactive or off).

In one embodiment, the phrase that "when channel decoding of the first radio signal is failed, whether the first radio signal can be excluded from being used for combined decoding for the first code block is dependent on whether the first time-frequency resource belongs to the target time-frequency resource pool" means that: when the channel decoding of the first radio signal is failed, if the first time-frequency resource belongs to the target time-frequency resource pool, bits output by channel coding of the first code block carried by the first radio signal can be excluded from being buffered by the first-type communication node; if the first time-frequency resource comprises time-frequency resources outside the target time-frequency resource pool, bits output by channel coding of the first code block carried by the first radio signal are buffered by the first-type communication node.

In one embodiment, the phrase that "when channel decoding of the first radio signal is failed, whether the first radio signal can be excluded from being used for combined decoding for the first code block is dependent on whether the first time-frequency resource belongs to the target time-frequency resource pool" means that: when the channel decoding of the first radio signal is failed, if the first time-frequency resource belongs to the target time-frequency resource pool, bits output by channel coding of the first code block carried by the first radio signal are buffered by the first-type communication node; if the first time-frequency resource comprises time-frequency resources outside the target time-frequency resource pool, bits output by channel coding of the first code block carried by the first radio signal are not buffered by the first-type communication node.

In one embodiment, the phrase that whether the first radio signal can be excluded from being used for combined decoding for the first code block is dependent on whether the second time-frequency resource belongs to the target time-frequency resource pool means that when the second time-frequency resource belongs to the target time-frequency resource pool, the first radio signal can be excluded from being used for combined decoding for the first code block; when the second time-frequency resource comprises time-frequency resources outside the target time-frequency resource pool, the first radio signal is used for the combined decoding for the first code block.

In one embodiment, the phrase that whether the first radio signal can be excluded from being used for combined decoding for the first code block is dependent on whether the second time-frequency resource belongs to the target time-frequency resource pool means that when the second time-frequency resource belongs to the target time-frequency resource pool, the first radio signal is used for combined decoding for the first code block; when the second time-frequency resource comprises time-frequency resources outside the target time-frequency resource pool, the first radio signal can be excluded from being used for the combined decoding for the first code block.

In one embodiment, the phrase that whether the first radio signal can be excluded from being used for combined decoding for the first code block is dependent on whether the second time-frequency resource belongs to the target time-frequency resource pool means that when the second time-frequency resource belongs to the target time-frequency resource pool, a HARQ of the first radio signal can be switched-off (deactive or off); when the second time-frequency resource comprises time-frequency resources outside the target time-frequency resource pool, a HARQ of the first radio signal is switched-on (active or on).

In one embodiment, the phrase that whether the first radio signal can be excluded from being used for combined decoding for the first code block is dependent on whether the second time-frequency resource belongs to the target time-frequency resource pool means that when the second time-frequency resource belongs to the target time-frequency resource pool, a HARQ of the first radio signal is switched-on (active or on); when the second time-frequency resource comprises time-frequency resources outside the target time-frequency resource pool, a HARQ of the first radio signal can be switched-off (deactive or off).

In one embodiment, the phrase that "when channel decoding of the first radio signal is failed, whether the first radio signal can be excluded from being used for combined decoding for the first code block is dependent on whether the second time-frequency resource belongs to the target time-frequency resource pool" means that: when the channel decoding of the first radio signal is failed, if the second time-frequency resource belongs to the target time-frequency resource pool, bits output by channel coding of the first code block carried by the first radio signal are not buffered by the first-type communication node; if the second time-frequency resource comprises time-frequency resources outside the target time-frequency resource pool, bits output by channel coding of the first code block carried by the first radio signal are buffered by the first-type communication node.

In one embodiment, the phrase that "when channel decoding of the first radio signal is failed, whether the first radio signal can be excluded from being used for combined decoding for the first code block is dependent on whether the second time-frequency resource belongs to the target time-frequency resource pool" means that: when the channel decoding of the first radio signal is failed, if the second time-frequency resource belongs to the target time-frequency resource pool, bits output by channel coding of the first code block carried by the first radio signal are buffered by the first-type communication node; if the second time-frequency resource comprises time-frequency resources outside the target time-frequency resource pool, bits output by channel coding of the first code block carried by the first radio signal are not buffered by the first-type communication node.

Embodiment 8

Figure 8:
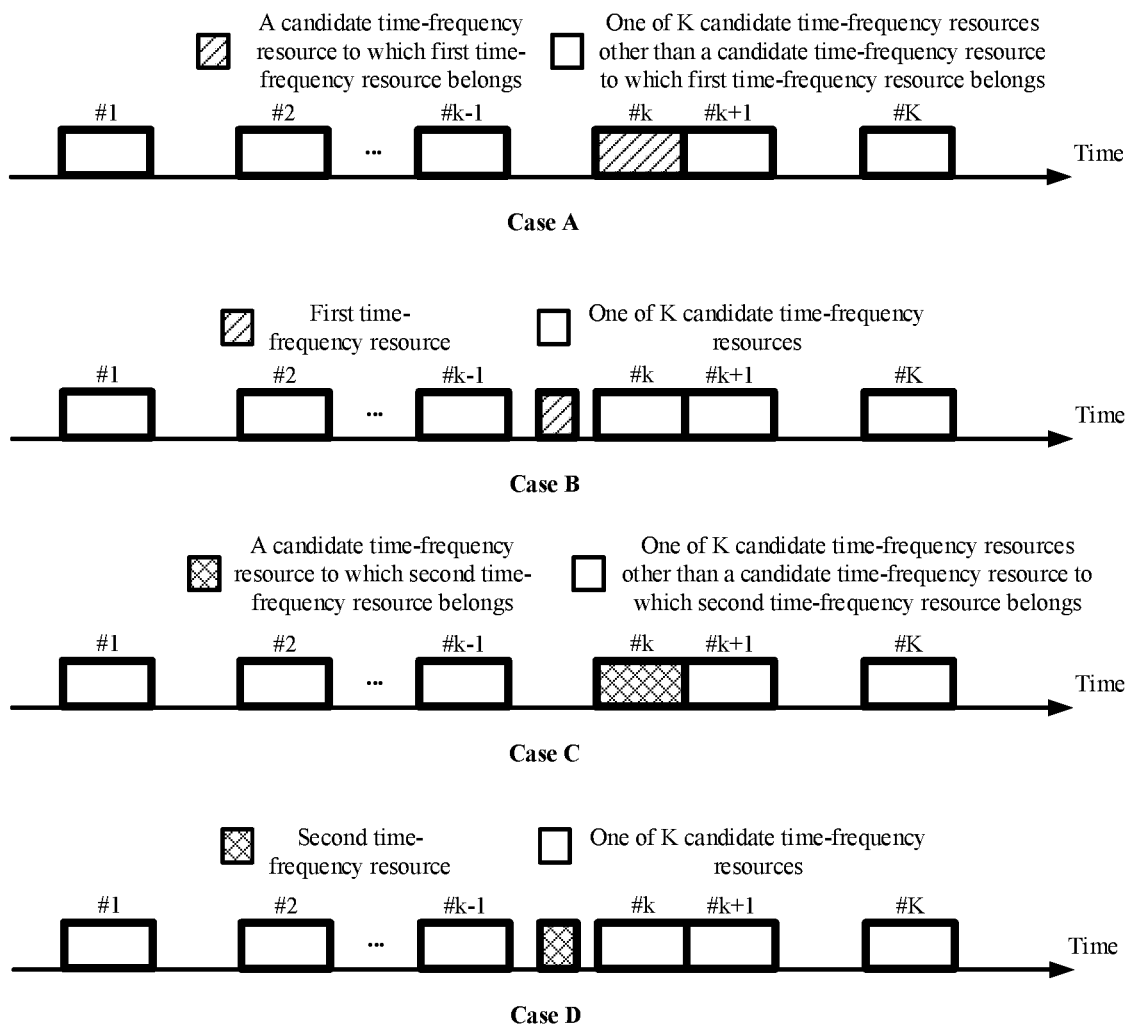
FIG. 8 illustrates a schematic diagram of K candidate time-frequency resource(s) according to one embodiment of the present disclosure.

Embodiment 8 illustrates a schematic diagram of K candidate time-frequency resource(s) according to one embodiment of the present disclosure, as shown in FIG. 8. In FIG. 8, as illustrated in Case A, each box represents a candidate time-frequency resource of K candidate time-frequency resources, and the slash-filled box represents one of the K candidate time-frequency resources to which a first time-frequency resource belongs; as illustrated in Case B, each blank box represents a candidate time-frequency resource of K candidate time-frequency resources, and the slash-filled box represents a first time-frequency resource; as illustrated in Case C, each box represents a candidate time-frequency resource of K candidate time-frequency resources, and the cross-filled box represents one of the K candidate time-frequency resources to which a second time-frequency resource belongs; as illustrated in Case D, each blank box represents a candidate time-frequency resource of K candidate time-frequency resources, and the cross-filled box represents a second time-frequency resource.

In Embodiment 8, the target time-frequency resource pool in the present disclosure comprises K candidate time-frequency resource(s), and the channel decoding of the first radio signal in the present disclosure is failed; whether the first time-frequency resource in the present disclosure belongs to one of the K candidate time-frequency resource(s) is used to determine whether the first radio signal can be excluded from being used for the combined decoding for the first code block, or whether the second time-frequency resource in the present disclosure belongs to one of the K candidate time-frequency resource(s) is used to determine whether the first radio signal can be excluded from being used for the combined decoding for the first code block; K is a positive integer.

In one embodiment, the target time-frequency resource pool is composed of the K candidate time-frequency resource(s).

In one embodiment, the target time-frequency resource pool only comprises the K candidate time-frequency resource(s).

In one embodiment, the target time-frequency resource pool also comprises time-frequency resources other than the K candidate time-frequency resource(s).

In one embodiment, any two of the K candidate time-frequency resources are orthogonal, the K being greater than 1.

In one embodiment, there isn't any time-frequency resource belonging to two of the K candidate time-frequency resources simultaneously, the K being greater than 1.

In one embodiment, the K is equal to 1.

In one embodiment, any of the K candidate time-frequency resource(s) comprises a positive integer number of slot(s) in time domain.

In one embodiment, any of the K candidate time-frequency resource(s) comprises a positive integer number of subframe(s) in time domain.

In one embodiment, any of the K candidate time-frequency resource(s) comprises a positive integer number of sub-slot(s) in time domain.

In one embodiment, any of the K candidate time-frequency resource(s) comprises contiguous frequency-domain resources in frequency domain.

In one embodiment, any of the K candidate time-frequency resource(s) comprises discrete frequency-domain resources in frequency domain.

In one embodiment, any of the K candidate time-frequency resource(s) comprises contiguous time-domain resources in time domain.

In one embodiment, any of the K candidate time-frequency resource(s) comprises discrete time-domain resources in time domain.

In one embodiment, any of the K candidate time-frequency resource(s) comprises all PRBs in a Carrier to which the candidate time-frequency resource belongs in frequency domain.

In one embodiment, any of the K candidate time-frequency resource(s) comprises part of PRBs in a Carrier to which the candidate time-frequency resource belongs in frequency domain.

In one embodiment, any two of the K candidate time-frequency resources occupy a same frequency-domain resource in frequency domain, the K being greater than 1.

In one embodiment, there are two candidate time-frequency resources of the K candidate time-frequency resources occupying different frequency-domain resources in frequency domain, the K being greater than 1.

In one embodiment, any two of the K candidate time-frequency resources occupy equal numbers of multicarrier symbols (OFDM symbols) in time domain, the K being greater than 1.

In one embodiment, there are two candidate time-frequency resources of the K candidate time-frequency resources occupying unequal numbers of multicarrier symbols (OFDM symbols) in time domain, the K being greater than 1.

In one embodiment, the phrase that the first information in the present disclosure is used to determine the target time-frequency resource pool means that the first information indicates the K candidate time-frequency resource(s).

In one embodiment, the phrase that the first information in the present disclosure is used to determine the target time-frequency resource pool means that the first information comprises a bitmap, and the bitmap is used to indicate the K candidate time-frequency resource(s), herein, a bit in the bitmap corresponds to one of the K candidate time-frequency resource(s).

In one embodiment, the first information in the present disclosure comprises a bitmap and a periodic value, of which the bitmap is used to indicate the K candidate time-frequency resource(s) within a period, and a time length of a period to which the K candidate time-frequency resource(s) belongs(belong) is equal to the periodic value comprised by the first information, herein, a bit in the bitmap corresponds to one of the K candidate time-frequency resource(s).

In one embodiment, the phrase that "whether the first time-frequency resource belongs to one of the K candidate time-frequency resource(s) is used to determine whether the first radio signal can be excluded from being used for the combined decoding for the first code block" means that whether the first time-frequency resource belongs to one of the K candidate time-frequency resource(s) is used by the first-type communication node to determine whether the first radio signal can be excluded from being used for the combined decoding for the first code block.

In one embodiment, the phrase that "whether the first time-frequency resource belongs to one of the K candidate time-frequency resource(s) is used to determine whether the first radio signal can be excluded from being used for the combined decoding for the first code block" means that whether the first time-frequency resource belongs to one of the K candidate time-frequency resource(s) is used to determine whether the first radio signal can be excluded from being used for the combined decoding for the first code block based on a given mapping relation.

In one embodiment, the phrase that "whether the first time-frequency resource belongs to one of the K candidate time-frequency resource(s) is used to determine whether the first radio signal can be excluded from being used for the combined decoding for the first code block" means that whether the first time-frequency resource belongs to one of the K candidate time-frequency resource(s) is used to determine whether the first radio signal can be excluded from being used for the combined decoding for the first code block based on a given mapping function.

In one embodiment, the phrase that "whether the first time-frequency resource belongs to one of the K candidate time-frequency resource(s) is used to determine whether the first radio signal can be excluded from being used for the combined decoding for the first code block" means that whether the first time-frequency resource belongs to one of the K candidate time-frequency resource(s) is used to determine whether the first radio signal can be excluded from being used for the combined decoding for the first code block based on a given mapping table.

In one embodiment, there is some other factor than whether the first time-frequency resource belongs to one of the K candidate time-frequency resource(s) being used to determine whether the first radio signal can be excluded from being used for the combined decoding for the first code block.

In one embodiment, only whether the first time-frequency resource belongs to one of the K candidate time-frequency resource(s) is used to determine whether the first radio signal can be excluded from being used for the combined decoding for the first code block.

In one embodiment, the phrase that "whether the second time-frequency resource belongs to one of the K candidate time-frequency resource(s) is used to determine whether the first radio signal can be excluded from being used for the combined decoding for the first code block" means that whether the second time-frequency resource belongs to one of the K candidate time-frequency resource(s) is used by the first-type communication node to determine whether the first radio signal can be excluded from being used for the combined decoding for the first code block.

In one embodiment, the phrase that "whether the second time-frequency resource belongs to one of the K candidate time-frequency resource(s) is used to determine whether the first radio signal can be excluded from being used for the combined decoding for the first code block" means that whether the second time-frequency resource belongs to one of the K candidate time-frequency resource(s) is used to determine whether the first radio signal can be excluded from being used for the combined decoding for the first code block based on a given mapping relation.

In one embodiment, the phrase that "whether the second time-frequency resource belongs to one of the K candidate time-frequency resource(s) is used to determine whether the first radio signal can be excluded from being used for the combined decoding for the first code block" means that whether the second time-frequency resource belongs to one of the K candidate time-frequency resource(s) is used to determine whether the first radio signal can be excluded from being used for the combined decoding for the first code block based on a given mapping function.

In one embodiment, the phrase that "whether the second time-frequency resource belongs to one of the K candidate time-frequency resource(s) is used to determine whether the first radio signal can be excluded from being used for the combined decoding for the first code block" means that whether the second time-frequency resource belongs to one of the K candidate time-frequency resource(s) is used to determine whether the first radio signal can be excluded from being used for the combined decoding for the first code block based on a given mapping table.

In one embodiment, there is some other factor than whether the second time-frequency resource belongs to one of the K candidate time-frequency resource(s) being used to determine whether the first radio signal can be excluded from being used for the combined decoding for the first code block.

In one embodiment, only whether the second time-frequency resource belongs to one of the K candidate time-frequency resource(s) is used to determine whether the first radio signal can be excluded from being used for the combined decoding for the first code block.

In one embodiment, whether the first time-frequency resource belongs to one of the K candidate time-frequency resource(s) and whether the second time-frequency resource belongs to one of the K candidate time-frequency resource(s) are used to determine whether the first radio signal can be excluded from being used for the combined decoding for the first code block.

In one embodiment, the phrase that "whether the first time-frequency resource belongs to one of the K candidate time-frequency resource(s) is used to determine whether the first radio signal can be excluded from being used for the combined decoding for the first code block" means that when the first time-frequency resource belongs to one of the K candidate time-frequency resource(s), the first radio signal can be excluded from being used for combined decoding for the first code block; when the first time-frequency resource comprises time-frequency resources other than the K candidate time-frequency resource(s), the first radio signal is used for the combined decoding for the first code block.

In one embodiment, the phrase that "whether the first time-frequency resource belongs to one of the K candidate time-frequency resource(s) is used to determine whether the first radio signal can be excluded from being used for the combined decoding for the first code block" means that when the first time-frequency resource belongs to one of the K candidate time-frequency resource(s), the first radio signal is used for combined decoding for the first code block; when the first time-frequency resource comprises time-frequency resources other than the K candidate time-frequency resource(s), the first radio signal can be excluded from being used for the combined decoding for the first code block.

In one embodiment, the phrase that "whether the first time-frequency resource belongs to one of the K candidate time-frequency resource(s) is used to determine whether the first radio signal can be excluded from being used for the combined decoding for the first code block" means that when the first time-frequency resource belongs to one of the K candidate time-frequency resource(s), a HARQ of the first radio signal can be switched-off (deactive or off); when the first time-frequency resource comprises time-frequency resources other than the K candidate time-frequency resource(s), a HARQ of the first radio signal is switched-on (active or on), which is used for combined decoding for the first code block.

In one embodiment, the phrase that "whether the first time-frequency resource belongs to one of the K candidate time-frequency resource(s) is used to determine whether the first radio signal can be excluded from being used for the combined decoding for the first code block" means that when the first time-frequency resource belongs to one of the K candidate time-frequency resource(s), a HARQ of the first radio signal is switched-on (active or on); when the first time-frequency resource comprises time-frequency resources other than the K candidate time-frequency resource(s), a HARQ of the first radio signal can be switched-off (deactive or off).

In one embodiment, the phrase that "when channel decoding of the first radio signal is failed, whether the first time-frequency resource belongs to one of the K candidate time-frequency resource(s) is used to determine whether the first radio signal can be excluded from being used for the combined decoding for the first code block" means that when the channel decoding of the first radio signal is failed, if the first time-frequency resource belongs to one of the K candidate time-frequency resource(s), bits output by channel coding of the first code block carried by the first radio signal can be excluded from being buffered by the first-type communication node; if the first time-frequency resource comprises time-frequency resources other than the K candidate time-frequency resource(s), bits output by channel coding of the first code block carried by the first radio signal are buffered by the first-type communication node.

In one embodiment, the phrase that "when channel decoding of the first radio signal is failed, whether the first time-frequency resource belongs to one of the K candidate time-frequency resource(s) is used to determine whether the first radio signal can be excluded from being used for the combined decoding for the first code block" means that when the channel decoding of the first radio signal is failed, if the first time-frequency resource belongs to one of the K candidate time-frequency resource(s), bits output by channel coding of the first code block carried by the first radio signal are buffered by the first-type communication node; if the first time-frequency resource comprises time-frequency resources other than the K candidate time-frequency resource(s), bits output by channel coding of the first code block carried by the first radio signal are not buffered by the first-type communication node.

In one embodiment, the phrase that "whether the second time-frequency resource belongs to one of the K candidate time-frequency resource(s) is used to determine whether the first radio signal can be excluded from being used for the combined decoding for the first code block" means that when the second time-frequency resource belongs to one of the K candidate time-frequency resource(s), the first radio signal can be excluded from being used for combined decoding for the first code block; when the second time-frequency resource comprises time-frequency resources other than the K candidate time-frequency resource(s), the first radio signal is used for the combined decoding for the first code block.

In one embodiment, the phrase that "whether the second time-frequency resource belongs to one of the K candidate time-frequency resource(s) is used to determine whether the first radio signal can be excluded from being used for the combined decoding for the first code block" means that when the second time-frequency resource belongs to one of the K candidate time-frequency resource(s), the first radio signal is used for combined decoding for the first code block; when the second time-frequency resource comprises time-frequency resources other than the K candidate time-frequency resource(s), the first radio signal can be excluded from being used for the combined decoding for the first code block.

In one embodiment, the phrase that "whether the second time-frequency resource belongs to one of the K candidate time-frequency resource(s) is used to determine whether the first radio signal can be excluded from being used for the combined decoding for the first code block" means that when the second time-frequency resource belongs to one of the K candidate time-frequency resource(s), a HARQ of the first radio signal can be switched-off (deactive or off); when the first time-frequency resource comprises time-frequency resources other than the K candidate time-frequency resource(s), a HARQ of the first radio signal is switched-on (active or on).

In one embodiment, the phrase that "whether the second time-frequency resource belongs to one of the K candidate time-frequency resource(s) is used to determine whether the first radio signal can be excluded from being used for the combined decoding for the first code block" means that when the second time-frequency resource belongs to one of the K candidate time-frequency resource(s), a HARQ of the first radio signal is switched-on (active or on); when the second time-frequency resource comprises time-frequency resources other than the K candidate time-frequency resource(s), a HARQ of the first radio signal can be switched-off (deactive or off).

In one embodiment, the phrase that "when channel decoding of the first radio signal is failed, whether the second time-frequency resource belongs to one of the K candidate time-frequency resource(s) is used to determine whether the first radio signal can be excluded from being used for the combined decoding for the first code block" means that when the channel decoding of the first radio signal is failed, if the second time-frequency resource belongs to one of the K candidate time-frequency resource(s), bits output by channel coding of the first code block carried by the first radio signal are not buffered by the first-type communication node; if the second time-frequency resource comprises time-frequency resources other than the K candidate time-frequency resource(s), bits output by channel coding of the first code block carried by the first radio signal are buffered by the first-type communication node.

In one embodiment, the phrase that "when channel decoding of the first radio signal is failed, whether the second time-frequency resource belongs to one of the K candidate time-frequency resource(s) is used to determine whether the first radio signal can be excluded from being used for the combined decoding for the first code block" means that when the channel decoding of the first radio signal is failed, if the second time-frequency resource belongs to one of the K candidate time-frequency resource(s), bits output by channel coding of the first code block carried by the first radio signal are buffered by the first-type communication node; if the second time-frequency resource comprises time-frequency resources other than the K candidate time-frequency resource(s), bits output by channel coding of the first code block carried by the first radio signal are not buffered by the first-type communication node.

Embodiment 9

Embodiment 9 illustrates a schematic diagram of relationship between time-frequency resources occupied by a first radio signal and a number of bits comprised in a first code block according to one embodiment of the present disclosure, as shown in FIG. 9. In FIG. 9, in the first column, the $N'_{RE}$ represents a number of Resource Elements (REs) comprised by each PRB in time-frequency resources occupied by a first radio signal in a slot; the $\overline{N}'_{RE}$ in the second column represents a number of REs after quantization of the $N'_{RE}$; in the third column, the $n_{PRB}$ represents a number of PRB s comprised by the time-frequency resources occupied by the first radio signal in frequency domain; the fourth column represents a Modulation Order employed by the first radio signal; the fifth column represents a number of bits comprised by a first code block. In Embodiment 9, the number of REs comprised by the time-frequency resources occupied by the first radio signal in the present disclosure is used to determine the number of bits comprised by the first code block in the present disclosure.

In one embodiment, the first signaling is also used to indicate a Modulation Coding Scheme (MCS) employed by the first radio signal, and the MCS employed by the first radio signal is used to determine a number of bits comprised by the first code block.

In one embodiment, the first signaling is also used to indicate spatial resources occupied by the first radio signal, and the spatial resources occupied by the first radio signal are used to determine the number of bits comprised by the first code block.

In one embodiment, the first signaling is a signaling indicating time-frequency resources that cannot be occupied by the first radio signal.

In one embodiment, the first signaling directly indicates time-frequency resources occupied by the first radio signal.

In one embodiment, the first signaling indirectly indicates time-frequency resources occupied by the first radio signal.

In one embodiment, the first signaling explicitly indicates time-frequency resources occupied by the first radio signal.

In one embodiment, the first signaling implicitly indicates time-frequency resources occupied by the first radio signal.

In one embodiment, the time-frequency resources occupied by the first radio signal comprise a positive integer number of RE(s).

In one embodiment, an RE occupies an Orthogonal Frequency Division Multiplexing (OFDM) subcarrier in frequency domain and an OFDM multicarrier symbol in time domain, of which a multicarrier symbol comprises Cyclic Prefix (CP).

In one embodiment, a number of REs comprised in the time-frequency resources occupied by the first radio signal is used by the first-type communication node to determine a number of bits comprised in the first code block.

In one embodiment, a number of REs comprised in the time-frequency resources occupied by the first radio signal is used by the first-type communication node to determine a number of bits comprised in the first code block based on a specific mapping relation.

In one embodiment, a number of REs comprised in the time-frequency resources occupied by the first radio signal is used by the first-type communication node to determine a number of bits comprised in the first code block based on a specific algorithm.

In one embodiment, a number of REs comprised in the time-frequency resources occupied by the first radio signal is used to determine a reference number of REs, and, the reference number of the REs, an MCS employed by the first radio signal and a layer number occupied by the first radio signal are used to determine a number of bits comprised by a first transport block (TB); the first TB goes through TB CRC Insertion, Code Block Segmentation and CB CRC Insertion to determine a number of bits comprised by the first code block.

In one embodiment, a number of REs comprised in the time-frequency resources occupied by the first radio signal determines the size of the first transport block (TB) in accordance with 3GPP TS38.214 (v15.1.0), section 5.1.3.2, and the first TB determines a number of bits comprised by the first code block in accordance with 3GPP TS38.212 (v15.1.0), section 5.1 and section 5.2; the first code block is obtained by the first TB sequentially through TB CRC Insertion, Code Block Segmentation and CB CRC Insertion.

Embodiment 10

Figure 10:
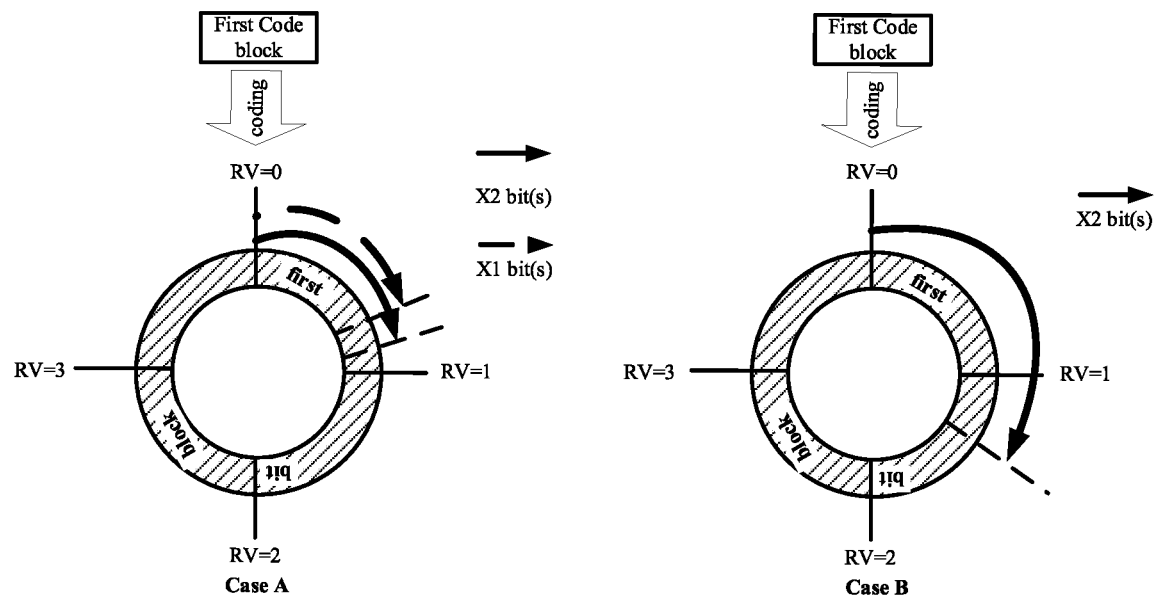
FIG. 10 illustrates a schematic diagram of relations among a first bit block, X1 bit(s) and X2 bit(s) according to one embodiment of the present disclosure.

Embodiment 10 illustrates a schematic diagram of relations among a first bit block, X1 bit(s) and X2 bit(s) according to one embodiment of the present disclosure, as shown in FIG. 10. In FIG. 10, a slash-filled annular zone represents a first bit block. In Case A, where the first-type communication node in the present disclosure simultaneously buffers the X1 bit(s) and the X2 bit(s) in the present disclosure, the zone indicated by a solid arrow represents X1 bit(s), while the zone indicated by a broken arrow represents X2 bit(s); in Case B, where the first-type communication node in the present disclosure only buffers the X2 bit(s) in the present disclosure, the zone indicated by a broken arrow represents X2 bit(s).

In Embodiment 10, the first code block in the present disclosure goes through channel coding to output a first bit block, and X1 bit(s) in the first bit block is(are) used to generate the first radio signal in the present disclosure, the first bit block comprising no fewer than X1 bit(s), X1 being a positive integer; the second signaling in the present disclosure is used to determine X2 bit(s) in the first bit block, the X2 bit(s) being used to generate the second radio signal in the present disclosure; of the X1 bit(s) and the X2 bit(s) only the X2 bit(s) is(are) used for decoding of the first code block.

In one embodiment, the X2 bit(s) is(are) also used together with bit(s) other than the X1 bit(s) for decoding of the first code block.

In one embodiment, only the X2 bit(s) is(are) used for decoding of the first code block.

In one embodiment, after reception of the second radio signal and before reception of another radio signal carrying bits in the first bit block, only the X2 bit(s) is(are) used for decoding of the first code block.

In one embodiment, another radio signal carrying bits in the first bit block is also received after reception of the second radio signal, the X2 bits being used for decoding of the first code block.

In one embodiment, another radio signal carrying bits in the first bit block is also received after reception of the second radio signal, the X2 bits not being used for decoding of the first code block.

In one embodiment, position(s) of the X2 bit(s) in the first bit block is(are) related to position(s) of the X1 bit(s) in the first bit block.

In one embodiment, a start time of transmitting the second radio signal in time domain is later than a start time of transmitting the first radio signal.

In one embodiment, a start time of transmitting the second radio signal is later than an end time of transmitting the first radio signal.

In one embodiment, the first radio signal is obtained by the X1 bit(s) sequentially through Rate Matching, Concatenation, Scrambling, a Modulation Mapper, a Layer Mapper, Precoding, a Resource Element Mapper and OFDM Baseband Signal Generation.

In one embodiment, a second bit block is obtained by the X1 bit(s) sequentially through Rate Matching and Concatenation with other bits, and the first radio signal is obtained by the second bit block sequentially through Scrambling, a Modulation Mapper, a Layer Mapper, Precoding, a Resource Element Mapper and OFDM Baseband Signal Generation.

In one embodiment, there is(are) bit(s) other than the X1 bit(s) being used to generate the first radio signal.

In one embodiment, the first radio signal is generated only by the X1 bit(s).

In one embodiment, the first radio signal is generated jointly by the X1 bit(s) and bit(s) other than the X1 bit(s).

In one embodiment, the second radio signal is obtained by the X2 bit(s) sequentially through Rate Matching, Concatenation, Scrambling, a Modulation Mapper, a Layer Mapper, Precoding, a Resource Element Mapper and OFDM Baseband Signal Generation.

In one embodiment, a third bit block is obtained by the X2 bit(s) sequentially through Rate Matching and Concatenation with other bits, and the second radio signal is obtained by the third bit block sequentially through Scrambling, a Modulation Mapper, a Layer Mapper, Precoding, a Resource Element Mapper and OFDM Baseband Signal Generation.

In one embodiment, there is(are) bit(s) other than the X2 bit(s) being used to generate the second radio signal.

In one embodiment, the second radio signal is generated only by the X2 bit(s).

In one embodiment, the second radio signal is generated jointly by the X2 bit(s) and bit(s) other than the X2 bit(s).

In one embodiment, the second radio signal comprises an initial transmission of a Transport Block (TB).

In one embodiment, the second radio signal comprises a retransmission of a Transport Block (TB).

In one embodiment, the second radio signal comprises an initial transmission of the first code block.

In one embodiment, the second radio signal comprises a retransmission of the first code block.

In one embodiment, the second radio signal is a retransmission of a Transport Block (TB) in a HARQ process.

In one embodiment, the second radio signal is a retransmission of one or more Code Block Groups (CBG) in a HARQ process.

In one embodiment, the second radio signal is a retransmission of a Code Block (CB) in a HARQ process.

In one embodiment, the second radio signal does not belong to any HARQ process.

In one embodiment, a HARQ process to which the second radio signal belongs is not defined.

In one embodiment, a HARQ process to which the second radio signal belongs is defined.

In one embodiment, a process ID of a HARQ process to which the second radio signal belongs is equal to a default value.

In one embodiment, a process ID of a HARQ process to which the second radio signal belongs is equal to 0.

In one embodiment, a process ID of a HARQ process to which the second radio signal belongs is equal to a maximum value that can be supported.

In one embodiment, a HARQ process to which the second radio signal belongs is a Broadcast HARQ Process, the second radio signal being unicast.

In one embodiment, the X2 is less than the number of bits in the first bit block.

In one embodiment, the X2 is a positive integer no greater than the X1.

In one embodiment, the X2 is a positive integer greater than the X1.

In one embodiment, the X2 is equal to the number of bits in the first bit block.

In one embodiment, the X2 bit(s) comprises each bit in the first bit block.

In one embodiment, the X2 bit(s) comprises(comprise) only part of bits in the first bit block.

In one embodiment, the first code block goes through channel coding to sequentially output the first bit block, the X1 bits being X1 consecutive bits comprised in the first bit block.

In one embodiment, the first code block goes through channel coding to sequentially output the first bit block, the X1 bits being X1 discrete bits comprised in the first bit block.

In one embodiment, the first code block goes through channel coding to sequentially output the first bit block, the X1 bits being X1 consecutive bits comprised in the first bit block that begin with a start bit of the first bit block.

In one embodiment, the first code block goes through channel coding to sequentially output the first bit block, the X1 bits being X1 consecutive bits comprised in the first bit block that begin with a bit other than a start bit of the first bit block.

In one embodiment, the first code block goes through channel coding to sequentially output the first bit block, the X2 bits being X2 consecutive bits comprised in the first bit block.

In one embodiment, the first code block goes through channel coding to sequentially output the first bit block, the X2 bits being X2 discrete bits comprised in the first bit block.

In one embodiment, the first code block goes through channel coding to sequentially output the first bit block, the X2 bits being X2 consecutive bits comprised in the first bit block that begin with a start bit of the first bit block.

In one embodiment, the first code block goes through channel coding to sequentially output the first bit block, the X2 bits being X2 consecutive bits comprised in the first bit block that begin with a bit other than a start bit of the first bit block.

In one embodiment, any of the X2 bit(s) belongs to the X1 bit(s).

In one embodiment, a Redundancy Version (RV) corresponding to the X1 bit(s) is equal to 0.

In one embodiment, a Redundancy Version (RV) corresponding to the X1 bit(s) is greater than 0.

In one embodiment, the first bit block is successively output by the first code block through channel coding, the X1 bits being X1 consecutive bits of a start bit obtained according to an RV of 0 in the first bit block.

In one embodiment, the first bit block is successively output by the first code block through channel coding, the X1 bits being X1 consecutive bits of a start bit determined in the first bit block according to an RV of 0 in the process of Rate Matching.

In one embodiment, the first bit block is successively output by the first code block through channel coding, the X1 bits being X1 consecutive bits of a start bit determined in the first bit block according to an RV of 0 and based on an operation specified in 3GPP TS38.212 (v15.1.0), section 5.4.2.

In one embodiment, a Redundancy Version (RV) corresponding to the X2 bit(s) is equal to 0.

In one embodiment, a Redundancy Version (RV) corresponding to the X2 bit(s) is greater than 0.

In one embodiment, the first bit block is successively output by the first code block through channel coding, the X2 bits being X2 consecutive bits of a start bit obtained according to an RV of 0 in the first bit block.

In one embodiment, the first bit block is successively output by the first code block through channel coding, the X2 bits being X2 consecutive bits of a start bit determined in the first bit block according to an RV of 0 in the process of Rate Matching.

In one embodiment, the first bit block is successively output by the first code block through channel coding, the X2 bits being X2 consecutive bits of a start bit determined in the first bit block according to an RV of 0 and based on an operation specified in 3GPP TS38.212 (v15.1.0), section 5.4.2.

In one embodiment, the channel coding refers to Low Density Parity Check (LDPC) Coding.

In one embodiment, the channel coding refers to Turbo Coding.

In one embodiment, the channel coding refers to Polar Coding.

In one embodiment, the channel coding refers to Convolutional Coding.

In one embodiment, the channel coding refers to Low Density Parity Check (LDPC) Coding in 3GPP TS38.212 (v15.1.0), section 5.3.2.

In one embodiment, the channel coding refers to Polar Coding in 3GPP TS38.212 (v15.1.0), section 5.3.1.

In one embodiment, the channel coding refers to Turbo Coding in 3GPP TS36.212, section 5.1.3.2.

In one embodiment, the channel coding refers to Convolutional Coding in 3GPP TS36.212, section 5.1.3.1.

In one embodiment, the X1 bit(s) is(are) not used for decoding of the first code block after the second radio signal is received.

In one embodiment, when channel decoding of the first radio signal is failed, the X1 bit(s) is(are) not used for combined decoding of the first code block.

In one embodiment, the first radio signal and the second radio signal correspond to a same HARQ process ID.

Embodiment 11

Figure 11:
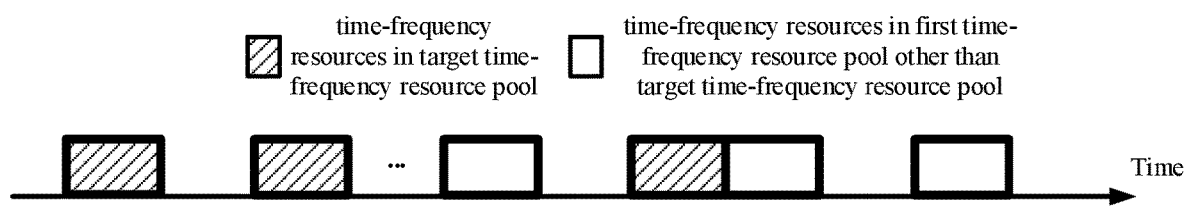
FIG. 11 illustrates a schematic diagram of relationship between a first time-frequency resource pool and a target time-frequency resource pool according to one embodiment of the present disclosure.

Embodiment 11 illustrates a schematic diagram of relationship between a first time-frequency resource pool and a target time-frequency resource pool according to one embodiment of the present disclosure, as shown in FIG. 11. In FIG. 11, each box represents a time-frequency resource in a first time-frequency resource pool, and each box filled with slashes represents a time-frequency resource in a target time-frequency resource pool.

In Embodiment 11, time-frequency resources occupied by the first signaling in the present disclosure belong to the first time-frequency resource pool, and time-frequency resources in the target time-frequency resource pool in the present disclosure belong to the first time-frequency resource pool.

In one embodiment, the target time-frequency resource pool is the first time-frequency resource pool.

In one embodiment, the first time-frequency resource pool also comprises time-frequency resources outside the target time-frequency resource pool.

In one embodiment, the first time-frequency resource pool comprises UE-specific Search Space Sets (USS Sets).

In one embodiment, the first time-frequency resource pool comprises a positive integer number of Control-resource set(s) (CORESET).

In one embodiment, the first time-frequency resource pool comprises time-frequency resources that may be used for transmitting a PDCCH.

In one embodiment, the first time-frequency resource pool is used to determine a USS.

In one embodiment, the phrase that the first information in the present disclosure is used to determine the target time-frequency resource pool means that the first information in the present disclosure indicates a second time-frequency resource pool, and time-frequency resources belonging to the first time-frequency resource pool and the second time-frequency resource pool simultaneously compose the target time-frequency resource pool.

In one embodiment, the phrase that the first information in the present disclosure is used to determine the target time-frequency resource pool means that the first information in the present disclosure indicates the target time-frequency resource pool in the first time-frequency resource pool.

Embodiment 12

Figure 12:
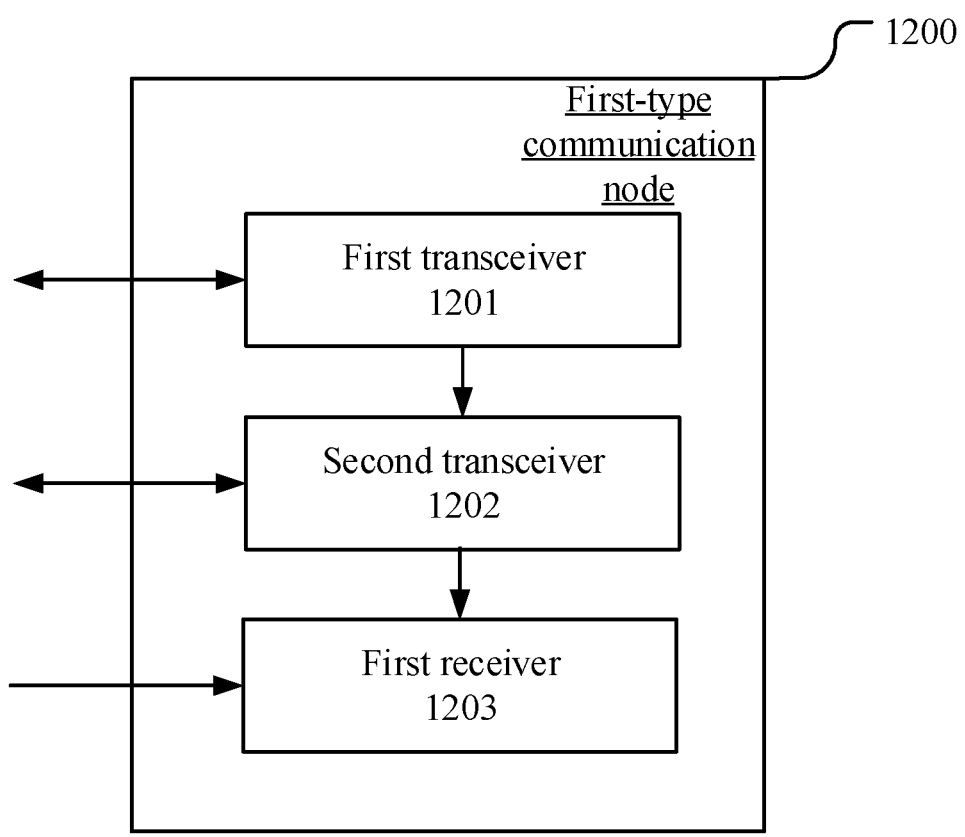
FIG. 12 illustrates a structure block diagram of a processing device in a first-type communication node according to one embodiment of the present disclosure.

Embodiment 12 illustrates a structure block diagram of a processing device in a first-type communication node, as shown in FIG. 12. In FIG. 12, a first-type communication node's processing device 1200 is composed of a first transceiver 1201, a second transceiver 1202 and a first receiver 1203. The first transceiver 1201 comprises the transmitter/receiver 456 (comprising the antenna 460), the receiving processor 452, the transmitting processor 455 and the controller/processor 490 in FIG. 4 of the present disclosure; the second transceiver 1202 comprises the transmitter/receiver 456 (comprising the antenna 460), the receiving processor 452 and the transmitting processor 455 in FIG. 4 of the present disclosure; the first receiver 1203 comprises the transmitter/receiver 456 (comprising the antenna 460), the receiving processor 452 and the controller/processor 490 in FIG. 4 of the present disclosure.

In Embodiment 12, the first transceiver 1201 receives first information, the first information being used to determine a target time-frequency resource pool; the second transceiver 1202 detects a first signaling; and the first receiver 1203, if the first signaling is detected, receives a first radio signal; herein, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface.

In one embodiment, the target time-frequency resource pool comprises K candidate time-frequency resource(s), and the channel decoding of the first radio signal is failed; whether the first time-frequency resource belongs to one of the K candidate time-frequency resource(s) is used to determine whether the first radio signal can be excluded from being used for the combined decoding for the first code block, or whether the second time-frequency resource belongs to one of the K candidate time-frequency resource(s) is used to determine whether the first radio signal can be excluded from being used for the combined decoding for the first code block; K is a positive integer.

In one embodiment, the first signaling is used to indicate time-frequency resources occupied by the first radio signal, and a number of resource elements comprised in the time-frequency resources occupied by the first radio signal is used to determine a number of bits comprised in the first code block.

In one embodiment, the second transceiver 1202 also receives a second signaling; the first receiver 1203 also receives a second radio signal; herein, the first code block goes through channel coding to output a first bit block, and X1 bit(s) in the first bit block is(are) used to generate the first radio signal, the first bit block comprising no fewer than X1 bit(s), X1 being a positive integer; the second signaling is used to determine X2 bit(s) in the first bit block, the X2 bit(s) being used to generate the second radio signal; of the X1 bit(s) and the X2 bit(s) only the X2 bit(s) is(are) used for decoding of the first code block; the second signaling is transmitted via the air interface.

In one embodiment, the second transceiver 1202 also transmits a third signaling; herein, the third signaling is used to indicate whether channel decoding of the first radio signal is failed, the third signaling being transmitted via the air interface.

In one embodiment, the first transceiver 1201 also transmits second information; herein, the second information is used to indicate a capability of combined decoding of a receiver of the first radio signal, the second information being transmitted via the air interface.

In one embodiment, the first transceiver 1201 also receives third information; herein, the third information is used to determine a first time-frequency resource pool, and time-frequency resources occupied by the first signaling belong to the first time-frequency resource pool, and all time-frequency resources in the target time-frequency resource pool belong to the first time-frequency resource pool, the third information being transmitted via the air interface.

Embodiment 13

Figure 13:
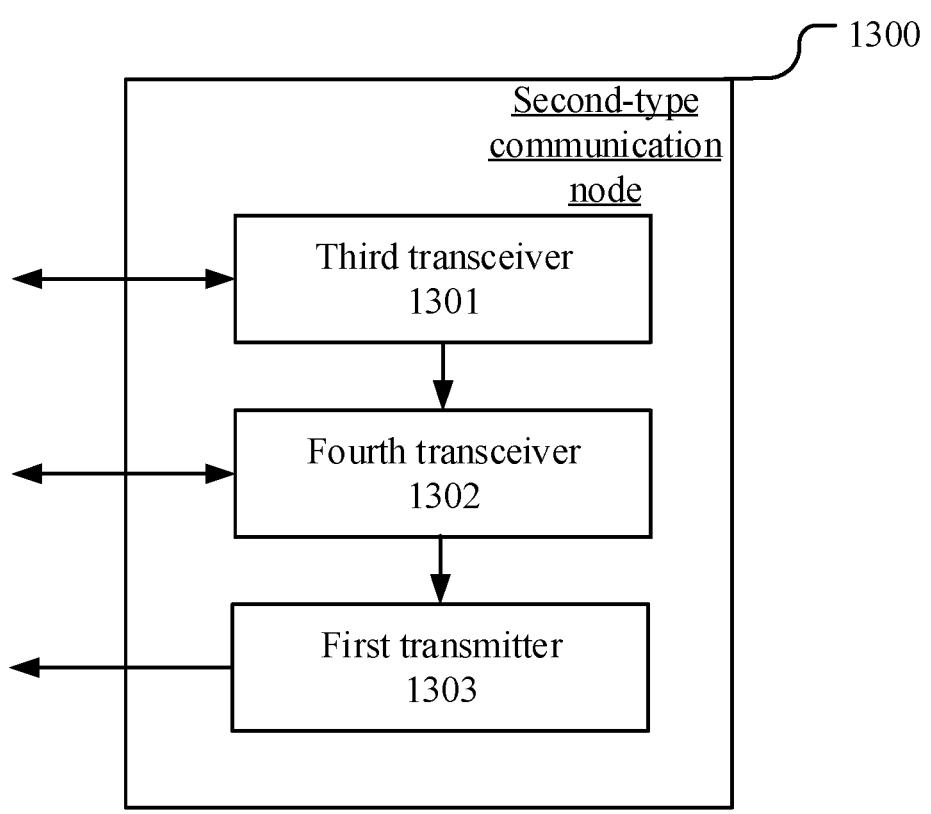
FIG. 13 illustrates a structure block diagram of a processing device in a second-type communication node according to one embodiment of the present disclosure.

Embodiment 13 illustrates a structure block diagram of a processing device in a second-type communication node, as shown in FIG. 13. In FIG. 13, a second-type communication node's processing device 1300 is composed of a third transceiver 1301, a fourth transceiver 1302 and a first transmitter 1303. The third transceiver 1301 comprises the transmitter/receiver 416 (comprising the antenna 420), the transmitting processor 415, the receiving processor 412 and the controller/processor 440 in FIG. 4 of the present disclosure; the fourth transceiver 1302 comprises the transmitter/receiver 416 (comprising the antenna 420), the transmitting processor 415 and the receiving processor 412 in FIG. 4 of the present disclosure; the first transmitter 1303 comprises the transmitter/receiver 416 (comprising the antenna 420), the transmitting processor 415 and the controller/processor 440 in FIG. 4 of the present disclosure.

In Embodiment 13, the third transceiver 1301 transmits first information, the first information being used to determine a target time-frequency resource pool; the fourth transceiver 1302 transmits a first signaling; and the first transmitter 1303 transmits a first radio signal; herein, a first code block is used to generate the first radio signal, and the first code block comprises a positive integer number of bit(s); time-frequency resources occupied by the first signaling comprise a first time-frequency resource, while time-frequency resources occupied by the first radio signal comprise a second time-frequency resource; when channel decoding of the first radio signal is failed, whether the first radio signal can be excluded from being used for combined decoding for the first code block is dependent on whether the first time-frequency resource belongs to the target time-frequency resource pool, or whether the first radio signal can be excluded from being used for combined decoding for the first code block is dependent on whether the second time-frequency resource belongs to the target time-frequency resource pool; the first information and the first signaling are transmitted via an air interface.

In one embodiment, the target time-frequency resource pool comprises K candidate time-frequency resource(s), and the channel decoding of the first radio signal is failed; whether the first time-frequency resource belongs to one of the K candidate time-frequency resource(s) is used to determine whether the first radio signal can be excluded from being used for the combined decoding for the first code block, or whether the second time-frequency resource belongs to one of the K candidate time-frequency resource(s) is used to determine whether the first radio signal can be excluded from being used for the combined decoding for the first code block; K is a positive integer.

In one embodiment, the first signaling is used to indicate time-frequency resources occupied by the first radio signal, and a number of resource elements comprised in the time-frequency resources occupied by the first radio signal is used to determine a number of bits comprised in the first code block.

In one embodiment, the fourth transceiver 1302 also transmits a second signaling; the first transmitter 1303 transmits a second radio signal; herein, the first code block goes through channel coding to output a first bit block, and X1 bit(s) in the first bit block is(are) used to generate the first radio signal, the first bit block comprising no fewer than X1 bit(s), X1 being a positive integer; the second signaling is used to determine X2 bit(s) in the first bit block, the X2 bit(s) being used to generate the second radio signal; of the X1 bit(s) and the X2 bit(s) only the X2 bit(s) is(are) used for decoding of the first code block; the second signaling is transmitted via the air interface.

In one embodiment, the fourth transceiver 1302 also receives a third signaling; herein, the third signaling is used to indicate whether channel decoding of the first radio signal is failed, the third signaling being transmitted via the air interface.

In one embodiment, the third transceiver 1301 also receives second information; herein, the second information is used to indicate a capability of combined decoding of a receiver of the first radio signal, the second information being transmitted via the air interface.

In one embodiment, the third transceiver 1301 also receives third information; herein, the third information is used to determine a first time-frequency resource pool, and time-frequency resources occupied by the first signaling belong to the first time-frequency resource pool, and all time-frequency resources in the target time-frequency resource pool belong to the first time-frequency resource pool, the third information being transmitted via the air interface.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first-type communication node or UE or terminal in the present disclosure includes but is not limited to mobile phones, tablet computers, notebooks, network cards, low-consumption equipment, enhanced MTC (eMTC) equipment, N-IOT terminals, vehicle-mounted equipment, aircrafts, airplanes, unmanned aerial vehicles, telecontrolled aircrafts, etc. The second-type communication node or base station or network side equipment in the present disclosure includes but is not limited to macro-cellular base stations, micro-cellular base stations, home base stations, relay base station, eNB, gNB, Transmitter Receiver Point (TRP), relay satellites, satellite base station, aerial base station, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method, comprising:
    receiving first information to determine a target time-frequency resource pool;
    monitoring a first signaling; and
    receiving a first radio signal when the first signaling is detected,
    wherein the first radio signal is generated based on a first code block that comprises a positive integer number of bit(s),
    wherein time-frequency resources occupied by the first signaling comprise a first time-frequency resource, and time-frequency resources occupied by the first radio signal comprise a second time-frequency resource,
    wherein when channel decoding of the first radio signal is failed, whether a hybrid automatic repeat request (HARQ) for the first radio signal can be switched off is dependent on either a) whether the first time-frequency resource belongs to the target time-frequency resource pool, or b) whether the second time-frequency resource belongs to the target time-frequency resource pool,
    wherein the first information and the first signaling are received via an air interface
    wherein the first information comprises all or part of a Radio Resource Control (RRC) signaling,
    wherein time-domain resources comprised by the target time-frequency resource pool are periodical in a time domain, and
    wherein the first signaling is received through a physical downlink control channel (PDCCH) in a user equipment (UE)-specific Search Space (USS), and the first radio signal is received through a Physical Downlink Shared Channel (PDSCH).

2. The method of claim 1, wherein the target time-frequency resource pool comprises K candidate time-frequency resource(s), and the channel decoding of the first radio signal is failed, wherein when the second time-frequency resource belongs to one of the K candidate time-frequency resource(s), a HARQ for the first radio signal can be switched-off (deactive or off), wherein when the first time-frequency resource comprises time-frequency resources other than the K candidate time-frequency resource(s), the HARQ for the first radio signal is switched-on (active or on), and wherein any of the K candidate time-frequency resource(s) comprises a positive integer number of slot(s) in the time domain, and K is a positive integer.

3. The method of claim 1, wherein the first signaling to indicates the time-frequency resources occupied by the first radio signal, and a number of bits comprised in the first code block is based on a number of resource elements (REs) comprised in the time-frequency resources occupied by the first radio signal, wherein a reference number of REs is based on the number of REs comprised in the time-frequency resources occupied by the first radio signal, wherein a number of bits comprised by a first transport block (TB) is based on the reference number of the REs, a modulation coding scheme (MCS) employed by the first radio signal, and a layer number occupied by the first radio signal, and wherein TB cyclic redundancy check (CRC) Insertion, Code Block (CB) Segmentation, and CB CRC Insertion are applied to the first TB to determine a number of bits comprised by the first code block.

4. The method of claim 1, further comprising transmitting a third signaling via the air interface, wherein the third signaling indicates whether the channel decoding of the first radio signal is failed, and wherein the third signaling carries ACK/NACK (A/N) Feedback information and is transmitted through a Physical Uplink Control Channel (PUCCH) or a Physical Uplink Shared Channel (PUSCH).

5. The method of claim 1, further comprising transmitting second information via the air interface, wherein the second information indicates a capability of combined decoding of a receiver of the first radio signal.

6. The method of claim 1, further comprising receiving third information via the air interface, wherein a first time-frequency resource pool is based on the third information, the time-frequency resources occupied by the first signaling belong to the first time-frequency resource pool, and all time-frequency resources in the target time-frequency resource pool belong to the first time-frequency resource pool, wherein the third information comprises all or part of the RRC signaling, wherein the first time-frequency resource pool also comprises time-frequency resources outside the target time-frequency resource pool, and wherein the first time-frequency resource pool comprises a positive integer number of Control-resource set(s) (CORESET).

7. The method of claim 1, wherein the first radio signal is obtained by the first code block sequentially through cyclic redundancy check (CRC) Insertion, Channel Coding, Rate Matching, Concatenation, Scrambling, Modulation, and Layer Mapping, Precoding, Mapping to Resource Element, and orthogonal frequency division multiplexing (OFDM) Baseband Signal Generation as well as Modulation and Upconversion, and wherein an initial value of a scrambling sequence is related to a characteristic identifier of a first-type communication node.

8. A first-type communication node for wireless communications, comprising:
a first transceiver configured to receive first information, wherein a target time-frequency resource pool is based on the first information;
a second transceiver configured to monitor a first signaling; and
a first receiver configured to receive a first radio signal when the first signaling is detected,
wherein the first radio signal is generated based on a first code block that comprises a positive integer number of bit(s),
wherein time-frequency resources occupied by the first signaling comprise a first time-frequency resource, and time-frequency resources occupied by the first radio signal comprise a second time-frequency resource,
wherein when channel decoding of the first radio signal is failed, whether a hybrid automatic repeat request (HARQ) for the first radio signal can be switched off is dependent on either a) whether the first time-frequency resource belongs to the target time-frequency resource pool, or b) whether the second time-frequency resource belongs to the target time-frequency resource pool,
wherein the first information and the first signaling are received via an air interface,
wherein the first information comprises all or part of a Radio Resource Control (RRC) signaling,
wherein time-domain resources comprised by the target time-frequency resource pool are periodical in a time domain, and
wherein the first signaling is received through a physical downlink control channel (PDCCH) in a user equipment (UE)-specific Search Space (USS), and the first radio signal is received through a Physical Downlink Shared Channel (PDSCH).

9. The first-type communication node of claim 8, wherein the target time-frequency resource pool comprises K candidate time-frequency resource(s), and the channel decoding of the first radio signal is failed, wherein when the second time-frequency resource belongs to one of the K candidate time-frequency resource(s), a HARQ for the first radio signal can be switched-off (deactive or off), wherein when the first time-frequency resource comprises time-frequency resources other than the K candidate time-frequency resource(s), the HARQ for the first radio signal is switched-on (active or on), and wherein any of the K candidate time-frequency resource(s) comprises a positive integer number of slot(s) in the time domain, and K is a positive integer.

10. The first-type communication node of claim 8, wherein the first signaling indicates the time-frequency resources occupied by the first radio signal, and a number of bits comprised in the first code block is based on a number of resource elements (REs) comprised in the time-frequency resources occupied by the first radio signal; wherein a reference number of REs is based on the number of REs comprised in the time-frequency resources occupied by the first radio signal, wherein a number of bits comprised by a first transport block (TB) is based on the reference number of the REs, a modulation coding scheme (MCS) employed by the first radio signal, and a layer number occupied by the first radio signal, and wherein TB cyclic redundancy check (CRC) Insertion, Code Block (CB) Segmentation, and CB CRC Insertion are applied to the first TB to determine a number of bits comprised by the first code block.

11. The first-type communication node of claim 8, wherein the second transceiver is configured to transmit a third signaling via the air interface, wherein the third signaling is used to indicates whether the channel decoding of the first radio signal is failed, and wherein the third signaling carries ACK/NACK (A/N) Feedback information and is transmitted through a Physical Uplink Control Channel (PUCCH) or a Physical Uplink Shared Channel (PUSCH).

12. The first-type communication node of claim 8, wherein the first transceiver is configured to transmit second information via the air interface, wherein the second information indicates a capability of combined decoding of a receiver of the first radio signal.

13. The first-type communication node of claim 8, wherein the first transceiver is configured to receive third information via the air interface, wherein a first time-frequency resource pool is based on the third information, the time-frequency resources occupied by the first signaling belong to the first time-frequency resource pool, and all time-frequency resources in the target time-frequency resource pool belong to the first time-frequency resource pool, wherein the third information comprises all or part of the RRC signaling, wherein the first time-frequency resource pool also comprises time-frequency resources outside the target time-frequency resource pool, and wherein the first time-frequency resource pool comprises a positive integer number of Control-resource set(s) (CORESET).

14. The first-type communication node of claim 8, wherein the first radio signal is obtained by the first code block sequentially through cyclic redundancy check (CRC) Insertion, Channel Coding, Rate Matching, Concatenation, Scrambling, Modulation, and Layer Mapping, Precoding, Mapping to Resource Element, and orthogonal frequency division multiplexing (OFDM) Baseband Signal Generation as well as Modulation and Upconversion, and wherein an initial value of a scrambling sequence is related to a characteristic identifier of the first-type communication node.

15. A second-type communication node for wireless communications, comprising:
   a third transceiver configured to transmit first information, wherein a target time-frequency resource pool is based on the first information;
   a fourth transceiver configured to transmit a first signaling; and
   a first transmitter configured to transmit a first radio signal,
   wherein the first radio signal is generated based on a first code block that comprises a positive integer number of bit(s),
   wherein time-frequency resources occupied by the first signaling comprise a first time-frequency resource, and time-frequency resources occupied by the first radio signal comprise a second time-frequency resource,
   wherein when channel decoding of the first radio signal is failed, whether a hybrid automatic repeat request (HARQ) for the first radio signal can be switched off is dependent on either a) whether the first time-frequency resource belongs to the target time-frequency resource pool, or b) whether the second time-frequency resource belongs to the target time-frequency resource pool,
   wherein the first information and the first signaling are transmitted via an air interface,
   wherein the first information comprises all or part of a Radio Resource Control (RRC) signaling,
   wherein time-domain resources comprised by the target time-frequency resource pool are periodical in a time domain and
   wherein the first signaling is transmitted through a physical downlink control channel (PDCCH) in a user equipment (UE)-specific Search Space (USS), and the first radio signal is transmitted through a Physical Downlink Shared Channel (PDSCH).

16. The second-type communication node of claim 15, wherein the target time-frequency resource pool comprises K candidate time-frequency resource(s), and the channel decoding of the first radio signal is failed, wherein when the second time-frequency resource belongs to one of the K candidate time-frequency resource(s), a HARQ for the first radio signal can be switched-off (deactive or off), wherein when the first time-frequency resource comprises time-frequency resources other than the K candidate time-frequency resource(s), the HARQ for the first radio signal is switched-on (active or on), and wherein any of the K candidate time-frequency resource(s) comprises a positive integer number of slot(s) in the time domain, and K is a positive integer.

17. The second-type communication node of claim 15, wherein the first signaling indicates the time-frequency resources occupied by the first radio signal, and a number of bits comprised in the first code block is based on a number of resource elements (REs) comprised in the time-frequency resources occupied by the first radio signal, wherein a reference number of REs is based on the number of REs comprised in the time-frequency resources occupied by the first radio signal, wherein a number of bits comprised by a first transport block (TB) is based on the reference number of the REs, a modulation coding scheme (MCS) employed by the first radio signal, and a layer number occupied by the first radio signal, and wherein TB cyclic redundancy check (CRC) Insertion, Code Block (CB) Segmentation, and CB CRC Insertion are applied to the first TB to determine a number of bits comprised by the first code block.

18. The second-type communication node of claim 15, wherein the third transceiver is configured to receive second information via the air interface, wherein the second information is used to indicates a capability of combined decoding of a receiver of the first radio signal.

19. The second-type communication node of claim 15, wherein the third transceiver is configured to transmit third information via the air interface, wherein a first time-frequency resource pool is based on the third information, the time-frequency resources occupied by the first signaling belong to the first time-frequency resource pool, and all time-frequency resources in the target time-frequency resource pool belong to the first time-frequency resource pool, wherein the third information comprises all or part of the RRC signaling, wherein the first time-frequency resource pool also comprises time-frequency resources outside the target time-frequency resource pool, and wherein the first time-frequency resource pool comprises a positive integer number of Control-resource set(s) (CORESET).

20. The second-type communication node of claim 15, wherein the first radio signal is obtained by the first code block sequentially through cyclic redundancy check (CRC) Insertion, Channel Coding, Rate Matching, Concatenation, Scrambling, Modulation, and Layer Mapping, Precoding, Mapping to Resource Element, and orthogonal frequency division multiplexing (OFDM) Baseband Signal Generation as well as Modulation and Upconversion, and wherein an initial value of a scrambling sequence is related to a characteristic identifier of a first-type communication node.

* * * * *

UNITED STATES PATENT AND TRADEMARK OFFICE
CERTIFICATE OF CORRECTION

PATENT NO. : 11,877,263 B2
APPLICATION NO. : 18/122722
DATED : January 16, 2024
INVENTOR(S) : Zheng Liu, Xiaobo Zhang and Lin Yang It is certified that error appears in the above-identified patent and that said Letters Patent is hereby corrected as shown below:

On the Title Page

(71) Applicant: "Honor Device Co., Ltd., Guangdong (CN)" should read "Honor Device Co., Ltd., Shenzhen (CN)"

(56) References Cited, U.S. Patent Documents: "8,855,069 B2 10/2014 Joachim et al." should read "8,855,069 B2 10/2014 Lohr et al."

In the Claims

Claim 3, Column 50, Lines 58-59: "signaling to indicates" should read "signaling indicates"

Claim 11, Column 52, Lines 41-42: "signaling is used to indicates" should read "signaling indicates"

Claim 18, Column 54, Lines 25-26: "information is used to indicates" should read "information indicates"

Signed and Sealed this
Twenty-seventh Day of February, 2024

Katherine Kelly Vidal
*Director of the United States Patent and Trademark Office*